(12) United States Patent
Tsutsui

(10) Patent No.: US 10,721,633 B2
(45) Date of Patent: Jul. 21, 2020

(54) BASE STATION, WIRELESS TERMINAL, WIRELESS COMMUNICATION SYSTEM, AND COMMUNICATION CONTROL METHOD

(71) Applicant: FUJITSU LIMITED, Kawasaki-shi, Kanagawa (JP)

(72) Inventor: Masafumi Tsutsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/994,413

(22) Filed: May 31, 2018

(65) Prior Publication Data

US 2018/0352446 A1 Dec. 6, 2018

(30) Foreign Application Priority Data

Jun. 6, 2017 (JP) .................................. 2017-111521

(51) Int. Cl.
*H04W 16/28* (2009.01)
*H04B 7/06* (2006.01)

(52) U.S. Cl.
CPC .......... *H04W 16/28* (2013.01); *H04B 7/0617* (2013.01); *H04B 7/0691* (2013.01)

(58) Field of Classification Search
CPC .... H04W 16/28; H04B 7/0691; H04B 7/0617
See application file for complete search history.

(56) References Cited

U.S. PATENT DOCUMENTS

| 6,038,263 | A  | * | 3/2000 | Kotzin | H04B 1/707 |
| | | | | | 375/299 |
| 6,594,226 | B1 | | 7/2003 | Benning et al. | |
| 9,871,565 | B2 | * | 1/2018 | Kusunoki | H04B 7/0452 |
| 10,396,885 | B2 | * | 8/2019 | Nicholls | H01Q 21/06 |
| 2002/0118727 | A1 | * | 8/2002 | Kim | H04B 1/707 |
| | | | | | 375/146 |
| 2003/0161410 | A1 | * | 8/2003 | Smith | H04B 7/0408 |
| | | | | | 375/267 |
| 2010/0164804 | A1 | * | 7/2010 | Xu | H04B 7/10 |
| | | | | | 342/372 |
| 2011/0280197 | A1 | * | 11/2011 | Brueck | H04B 7/0417 |
| | | | | | 370/329 |
| 2013/0076566 | A1 | * | 3/2013 | Jiang | H01Q 1/246 |
| | | | | | 342/373 |

(Continued)

FOREIGN PATENT DOCUMENTS

JP 2001-237750 A 8/2001

*Primary Examiner* — Kenneth T Lam
(74) *Attorney, Agent, or Firm* — Arent Fox LLP

(57) ABSTRACT

A communication control method, for causing a wireless communication device including an antenna array including a plurality of antenna elements to execute a process, includes: executing a first process that includes dividing the plurality of antenna elements into a plurality of element blocks, each of the plurality of element blocks including two or more antenna elements; executing a second process that includes forming a broad beam by steering beams that are formed by first and second element blocks of the plurality of element blocks the beam formed by the first element block being orthogonalized with the beam formed by the second element block; and executing a third process that includes orthogonalizing a first signal to be transmitted by the first element block and a second signal to be transmitted by the second element block.

9 Claims, 20 Drawing Sheets

(56) References Cited

U.S. PATENT DOCUMENTS

| | | | | |
|---|---|---|---|---|
| 2013/0077580 A1* | 3/2013 | Kang | ................... | H04B 7/061 |
| | | | | 370/329 |
| 2015/0249488 A1* | 9/2015 | Wu | ....................... | H01Q 21/00 |
| | | | | 375/267 |
| 2015/0358056 A1* | 12/2015 | Kusunoki | ............ | H04B 7/0456 |
| | | | | 370/329 |
| 2016/0380690 A1* | 12/2016 | Jidhage | .................... | H04B 7/10 |
| | | | | 375/267 |
| 2017/0055281 A1* | 2/2017 | Islam | ................ | H04W 72/0446 |
| 2017/0085289 A1* | 3/2017 | Jan | ....................... | H04B 7/0617 |
| 2017/0352953 A1* | 12/2017 | Petersson | ............ | H04B 7/0617 |

* cited by examiner

FIG. 12

| DIVISION PATTERN | ELEMENT BLOCK | |
|---|---|---|
| NO DIVISION | {1,2,3,4,5,6,7,8,9,10,11,12,13,14,15,16} | NB CONTROL MODE |
| (4, 4, 4, 4) | {1,2,3,4}, {5,6,7,8}, {9,10,11,12}, {13,14,15,16} | BB CONTROL MODE |
| (8, 8) | {1,2,3,4,5,6,7,8}, {9,10,11,12,13,14,15,16} | |
| (4, 4, 4, 2, 2) | {1,2,3,4}, {5,6,7,8}, {9,10,11,12}, {13,14}, {15,16} | |
| CYCLIC | {1,5,9,13}, {2,6,10,14}, {3,7,11,15}, {4,8,12,16} | |

FIG. 17

| MOVING SPEED | BEAM WIDTH | DIVISION PATTERN | BLOCK NUMBER | SPREADING FACTOR | IRREGULAR NUMBER |
|---|---|---|---|---|---|
| LOW SPEED | NARROW | NO DIVISION | 1 | — | NO |
| MEDIUM-LOW SPEED | | (8,8) | 2 | 2 OR MORE | NO |
| MEDIUM SPEED | | (4,4,4,4) | 4 | 4 OR MORE | NO |
| MEDIUM-HIGH SPEED | | (4,4,2,2,2) | 6 | 8 OR MORE | YES |
| HIGH SPEED | WIDE | (2, 2, 2, 2, 2, 2, 2, 2) | 8 | 8 OR MORE | NO |

BASE STATION, WIRELESS TERMINAL, WIRELESS COMMUNICATION SYSTEM, AND COMMUNICATION CONTROL METHOD

CROSS-REFERENCE TO RELATED APPLICATION

This application is based upon and claims the benefit of priority of the prior Japanese Patent Application No. 2017-111521, filed on Jun. 6, 2017, the entire contents of which are incorporated herein by reference.

FIELD

The embodiments discussed herein are related to a base station, a wireless terminal, a wireless communication system, and a communication control method.

BACKGROUND

In a fifth-generation mobile communication system, in order to realize increase in gain in a high frequency range or increase in system throughput using an antenna array (a multi-element antenna) including a plurality of antenna elements, research and development have been conducted. For example, beam tracking technology in which a wireless terminal that moves is caused to track a beam by beamforming (BF) using a multi-element antennal has been examined.

It is possible to narrow down a beam in a specific direction by performing BF using a multi-element antenna and thus achieve a high gain. On the other hand, when a wireless terminal goes off from the direction of the beam, reception characteristics are deteriorated. If a beam width is narrow, a risk that a wireless terminal goes off from the direction of a beam increases. However, when a beam (a broad beam) with a wide beam width is used, a risk that a wireless terminal goes off from the direction of a beam is reduced.

Note that a method in which the number of antenna elements is increased to increase a diversity gain and thus improve a signal-to-noise ratio (SNR) of a receiver has been proposed. In this method, first and second representative data streams which have been coded using a Walsh code are transmitted from first and second antenna groups arranged apart from one another by a distance that is ten times or larger than a carrier wavelength, respectively.

Examples of the related art include Japanese Laid-open Patent Publication No. 2001-237750.

SUMMARY

According to an aspect of the invention, a communication control method, for causing a wireless communication device including an antenna array including a plurality of antenna elements to execute a process, includes: executing a first process that includes dividing the plurality of antenna elements into a plurality of element blocks, each of the plurality of element blocks including two or more antenna elements; executing a second process that includes forming a broad beam by steering beams that are formed by first and second element blocks of the plurality of element blocks, the beam formed by the first element block being orthogonalized with the beam formed by the second element block; and executing a third process that includes orthogonalizing a first signal to be transmitted by the first element block and a second signal to be transmitted by the second element block.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of pattern information.

FIG. 17 is a table illustrating the modified example (Modified Example #1: Control of Spreading Factor) of the second embodiment.

DESCRIPTION OF EMBODIMENTS

A beam width of a beam that is formed by a multi-element antenna depends on the number of antenna elements that form the beam. As the number of antenna elements increases, the beam width reduces, and therefore, it is possible to increase the beam width by forming a beam using fewer antenna elements. However, when the number of antenna elements reduces, an output reduces. If a power amount that is supplied to each of individual antenna elements is increased in order to reduce reduction in output, a large power load is applied to the antennal elements.

According to an aspect, it is an object of the present disclosure to provide a base station, a wireless terminal, a wireless communication system, and a communication control method that are able to reduce a load that is applied to antenna elements when forming a broad beam.

Embodiments of the present disclosure will be described below with reference to the accompanying drawings. Note that, in the present specification and drawings, elements having substantially the same function are denoted by the same reference symbol, and therefore, a repetition of the description thereof is sometimes omitted.

1. First Embodiment

Figure 1:
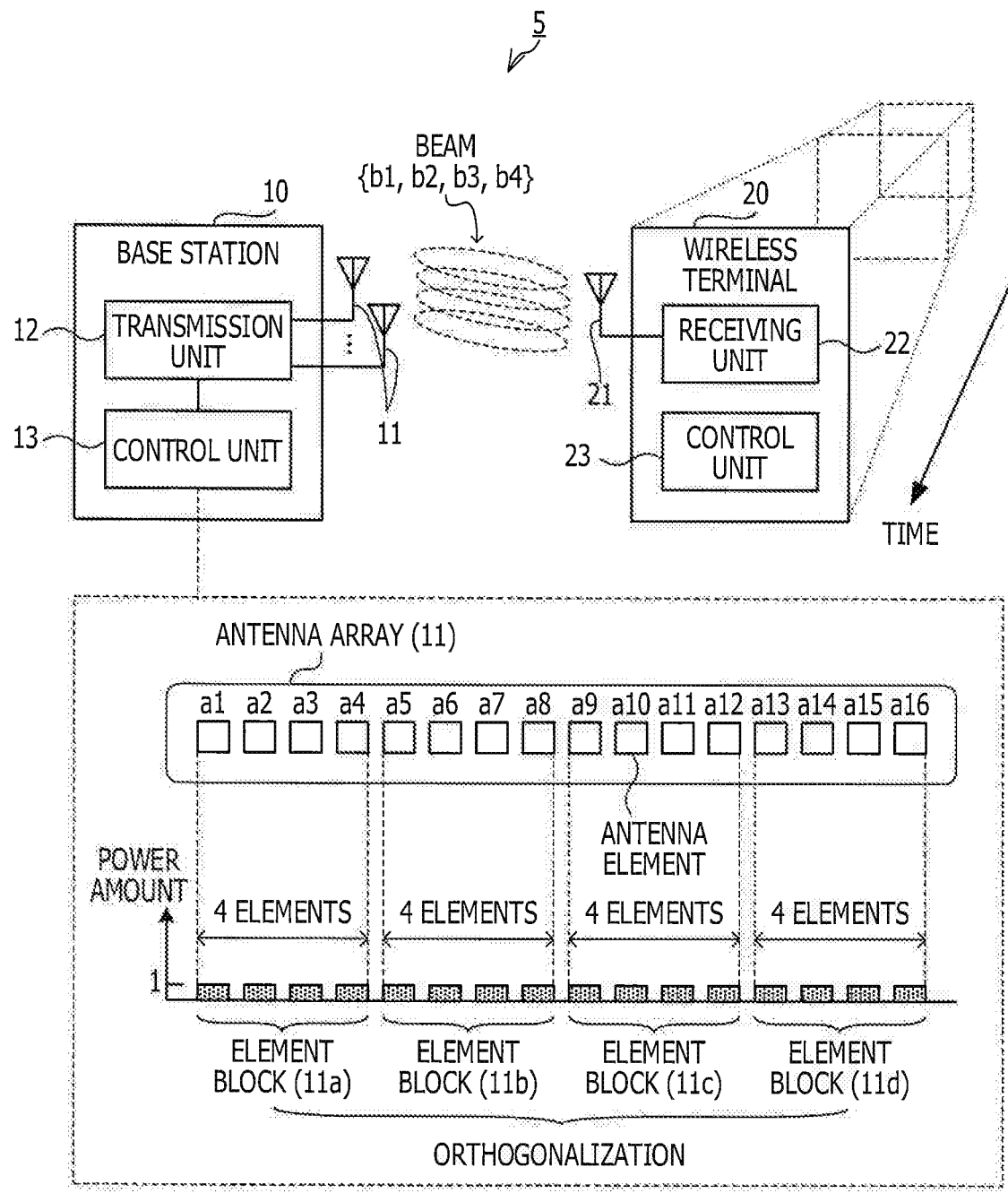
FIG. 1 is a diagram illustrating an example of a wireless communication system according to a first embodiment.

With reference to FIG. 1, a first embodiment will be described.

The first embodiment is related to a method for reducing a power load that is applied to each antenna element of an antenna array when forming a broad beam using the antenna array (a multi-element antenna). FIG. 1 is a diagram illustrating an example of a wireless communication system according to the first embodiment. Note that a wireless communication system 5 illustrated in FIG. 1 is an example of a wireless communication system according to the first embodiment.

As illustrated in FIG. 1, the wireless communication system 5 includes a base station 10 and a wireless terminal 20.

Note that the number of wireless terminals included in the wireless communication system 5 may be two or more. The wireless terminal 20 moves. A position and moving speed of the wireless terminal 20 are detected by an accelerator sensor or a global positioning system (GPS) or from a preferable beam direction that is specified between the base station 10 and the wireless terminal 20 and a change in the beam direction.

For example, when BF is performed, the wireless terminal 20 receives reception power of a known signal (a pilot signal or a reference signal) which is transmitted from the base station 10 in a plurality of different directions and feeds back information (an index) of a beam direction in which reception power is high to the base station 10. A relative positional relationship between the base station 10 and the wireless terminal 20 is estimated from the index that is fed back from the wireless terminal 20. Also, the moving speed of the wireless terminal 20 is estimated from a change with time of the index. Note that some other estimation method is also applicable.

The base station 10 includes an antenna array 11, a transmission unit 12, and a control unit 13. The wireless terminal 20 includes an antenna 21, a receiving unit 22, and a control unit 23.

Note that each of the control units 13 and 23 is a processor, such as a central processing unit (CPU), a digital signal processor (DSP), an application specific integrated circuit (ASIC), a field programmable gate array (FPGA), or the like. Also, the control units 13 and 23 are able to access a storage device (not illustrated), such as a random access memory (RAM) a hard disk drive (HDD), a solid state derive (SSD), a flash memory, or the like.

The antenna array 11 includes a plurality of antenna elements. An interval between the antenna elements is set to be, for example, ½ of a carrier wavelength $\lambda$.

In the example of FIG. 1, the antenna array 11 includes antenna elements a1, a2, . . . , and a16. Each of the antenna elements a1, a2, . . . , and a16 will be sometimes merely referred to as an element below.

Note that, although, in the example of FIG. 1, for convenience of description, the antenna elements a1, a2, . . . , and a16 are one-dimensionally arranged, an antenna array 11 in which the antenna element a1, a2, . . . , and a16 are two-dimensionally arranged may be employed. For example, an antenna array 11 in which n elements and m elements are arranged lengthwise and breadthwise, respectively, (4 elements×4 elements, 2 elements×8 elements) on a planar substrate may be employed. Also, the number of antenna elements that forms the antenna array 11 is some other number than 16.

The transmission unit 12 includes, for example, an RF circuit that processes a radio frequency (RF) signal, a BB circuit that processes a base-band (BB) signal, or the like. The FR circuit includes a signal processing circuit that executes processing, such as frequency conversion in which a signal (a BB signal) in a BB region is converted to a signal (a RF signal) in an RF region, digital-to-analog (DA) conversion in which a digital signal is converted to an analog signal, or the like. Also, the RF circuit includes a phase shifter that shifts a phase of the RF signal that is input to the antenna elements. The BB circuit includes, for example, a modulation circuit that executes modulation processing by a predetermined modulation method (binary phase shift keying (BPSK), quadrature phase shift keying (QPSK), quadrature amplitude modulation (16QAM), 64QAM, or the like).

An operation of the transmission unit 12 is controlled by the control unit 13. The control unit 13 divides the antenna elements a1, a2, . . . , and a16 that form the antenna array 11 into element blocks 11a, 11b, 11c, and 11d each of which includes two or more antenna elements.

For example, if the moving speed of the wireless terminal 20 is larger than a predetermined threshold, the control unit 13 divides the antenna array 11 into the element blocks 11a, 11b, 11c, and 11d, controls the transmission unit 12, and forms a broad beam using the element blocks 11a, 11b, 11c, and 11d. Note that the broad beam is a beam with a wider beam width than that of a beam (a narrow beam) that is formed using all of the antenna elements a1, a2, . . . , and a16.

In the example of FIG. 1, the element block 11a includes the antenna elements a1, a2, a3, and a4. The element block 11b includes the antenna elements a5, a6, a7, and a8. The element block 11c includes the antenna elements a9, a10, a11, and a12. The element block 11d includes the antenna elements a13, a14, a15, and a16.

Note that, although, in the example of FIG. 1, for convenience of description, a method in which the antenna array 11 is divided into four element blocks each including four elements is illustrated, a method for dividing the antenna array 11 is not limited thereto.

The control unit 13 steers beams that are formed by the first and second element blocks of the element blocks 11a, 11b, 11c, and 11d in the same direction. Also, the control unit 13 orthogonalizes a signal that is transmitted by the first element block and a signal that is transmitted by the second element block.

To simplify description, a case in which the element blocks 11a and 11b are used for transmission to the wireless terminal 20 will be described as an example. In this case, the control unit 13 selects the element block 11a as the first element block and the element block 11b as the second element block.

Then, the control unit 13 controls the transmission unit 12 and steers a beam that is formed by the element block 11a and a beam that is formed by the element block 11b in a direction toward the wireless terminal 20 using BF. For example, the control unit 13 sets, for a group of phase shifters that are coupled to the element block 11a and a group of phase shifters that are coupled to the element block 11b, a group (a BF weight vector) of BF weights that correspond to the same direction. Note that signals of the same data are transmitted from the element blocks 11a and 11b.

The control unit 13 orthogonalizes a signal that is transmitted by the element block 11a and a signal that is transmitted by the element block 11b. Also, the control unit 13 controls the transmission unit 12 and transmits signals after being orthogonalized from the element blocks 11a and 11b.

As a method for orthogonalization, for example, a method in which each of signals that are transmitted from the element blocks 11a and 11b is multiplied by a spread code may be used. Also, a method in which a signal that is transmitted by the element block 11a and a signal that is transmitted by the element block 11b are transmitted in different frequency bands may be used.

A case in which the number of element blocks that are used is increased to four and the element blocks 11a, 11b, 11c, and 11d are used for transmission to the wireless terminal 20 will be described below. Even when the number of element blocks increases, control and orthogonalization of beams may be performed in accordance with similar procedures to those described above.

In this case, the control unit 13 steers each of beams b1, b2, b3, and b4 that are formed by the element blocks 11a, 11b, 11c, and 11d, respectively, in a direction toward the wireless terminal 20. For example, it is possible to steer, by setting groups of BF weights which correspond to the same direction for the element blocks 11a, 11b, 11c, and 11d, the beams b1, b2, b3, and b4 toward the wireless terminal 20. Also, the control unit 13 mutually orthogonalizes signals that are transmitted by the element blocks 11a, 11b, 11c, and 11d using a spread code or a plurality of different frequency bands.

The receiving unit 22 receives a signal via the antenna 21. Note that the number of antennas of the wireless terminal 20 may be two or more. The receiving unit 22 includes an RF circuit that processes an RF signal a BB circuit that processes a BB signal, or the like. Examples of the RF circuit include a signal processing circuit that executes processing, such as frequency conversion in which an RF signal is converted to a BB signal, analog-to-digital (AD) conversion, or the like. Examples of the BB circuit include a modulation circuit that executes modulation processing by a predetermined modulation method (BPSK, QPSK, 16QAM, 64QAM, or the like) and a synthesizer that synthesizes a plurality of BB signals.

An operation of the receiving unit 22 is controlled by the control unit 23. The control unit 23 controls the receiving unit 22, receives signals after being orthogonalized, which are transmitted by the beams b1, b2, b3, ad b4, and performs inverse conversion of orthogonalization on the received signals to restore signals before being orthogonalized.

For example, if signals have been orthogonalized using a spread code, the control unit 23 restores signals before being orthogonalized by inverse spreading. On the other hand, if signals are orthogonalized using a plurality of different frequency bands, the control unit 23 controls the receiving unit 22 and receives a signal in each of the frequency bands. The control unit 23 controls the receiving unit 22 and synthesizes restored signals before being orthogonalized to generate a synthesized signal. Then, the control unit 23 executes decoding processing on the generated synthesized signal.

As described above, it is possible to form a broad beam by dividing the antenna array 11 into the element blocks 11a, 11b, 11c, and 11d and orthogonalizing signals that are transmitted by the element blocks 11a, 11b, 11c, and 11d. A broad beam is formed, and thereby, even when the wireless terminal 20 moves at high speed, a risk that the wireless terminal 20 goes off from a direction of a beam and reception characteristics are largely deteriorated is reduced.

Also, signals that are transmitted by the element blocks 11a, 11b, 11c, and 11d are synthesized by the wireless terminal 20, and thereby, it is possible to efficiently increase a gain without increasing a power amount that is supplied to each of the antenna elements a1, a2, ..., and a16. Therefore, it is possible to reduce increase in power load that is applied to the antenna elements a1, a2, ..., and a16 when forming a broad beam.

The first embodiment has been described above.

2. Second Embodiment

Next, a second embodiment will be described. The second embodiment is related to a method for reducing a power load that is applied to each antenna element of an antenna array (a multi-element antenna) when forming a broad beam using the antenna array.

2-1. System

Figure 2:
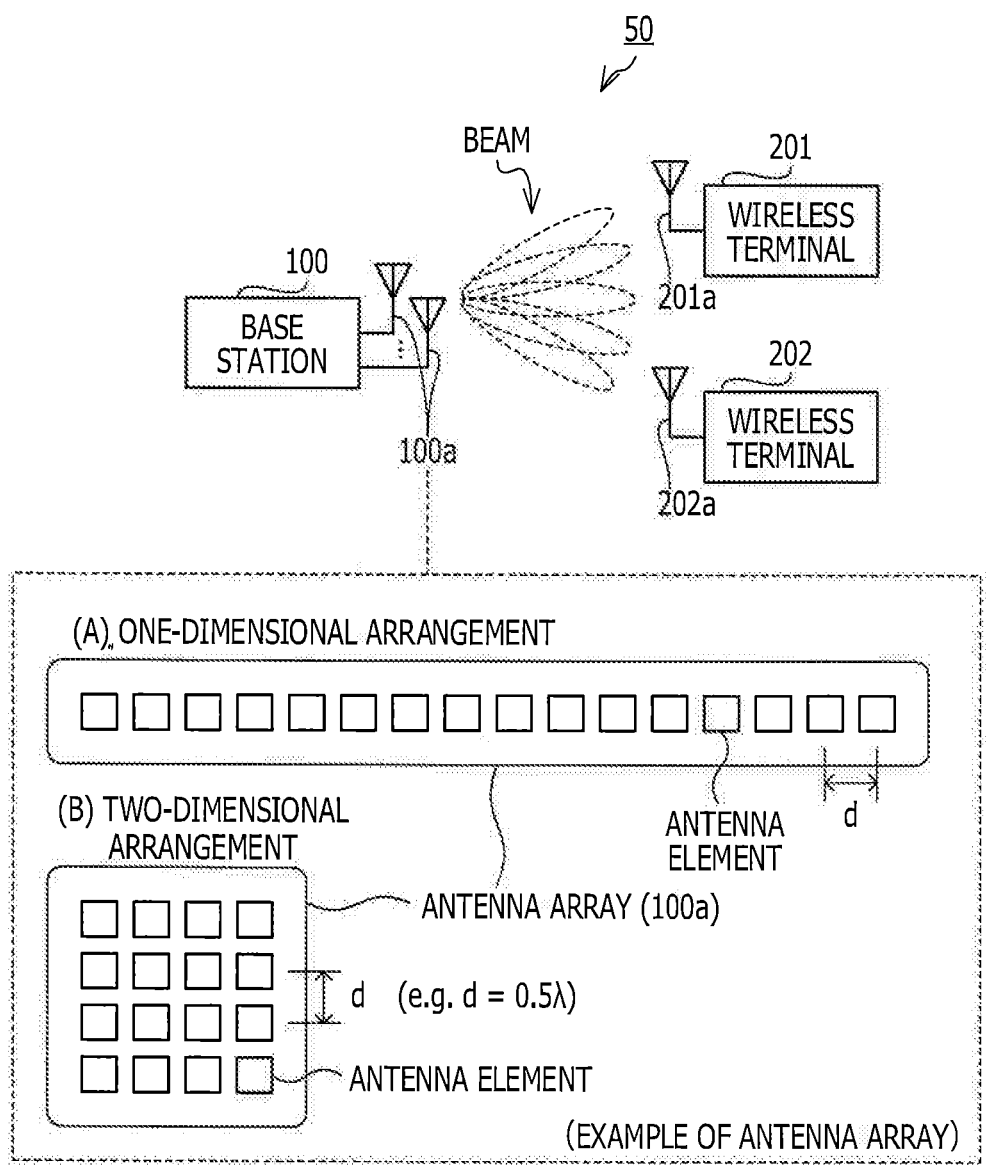
FIG. 2 is a diagram illustrating an example of a wireless communication system according to a second embodiment.

With reference to FIG. 2, a wireless communication system 50 will be described. FIG. 2 is a diagram illustrating an example of a wireless communication system according to the second embodiment. Note that the wireless communication system 50 illustrated in FIG. 2 is an example of a wireless communication system according to the second embodiment.

As illustrated in FIG. 2, the wireless communication system 50 includes a base station 100 and wireless terminals 201 and 202. Note that the number of wireless terminals may be some other number than two. The base station 100 includes an antenna array 100a. The wireless terminals 201 and 202 include antennas 201a and 202a, respectively. The antenna array 100a includes a plurality of antenna elements. The base station 100 performs BF using the antenna array 100a.

For example, when the base station 100 transmits a signal to the wireless terminal 201, the base station 100 steers beams (parts in which electric waves are intensified by one anther due to interference) in a direction toward the wireless terminal 201 and steers NULL (parts in which electric waves are cancelled by one another due to interference) toward the wireless terminal 202.

Note that it is possible to control a direction of a beam by changing a phase of an electric wave that is output from each antenna element. A beam width depends on the number of antenna elements that form a beam. As the number of antenna elements increases, the beam width reduces. The beam width may be represented by an index, such as, for example, a half-value width (an angle width that gives a half value of a peak) in an angle distribution of a gain, or the like.

Incidentally, an arrangement pattern of the antenna elements and the number of antenna elements in the antenna array 100a may be freely set. For example, (A) of FIG. 2 illustrates an arrangement pattern in which sixteen antenna elements are one-dimensionally arranged. On the other hand, (B) of FIG. 2 illustrates an arrangement pattern in which sixteen antenna elements are arranged in four rows and four columns (in a two-dimensional arrangement). An interval d between the antenna elements is set to be, for example, ½ of the carrier wavelength λ.

In the one-dimensional arrangement, the number of antenna elements and the interval d between the antenna elements may be modified. In the two-dimensional arrangement, in addition to the number of antenna elements and the interval d between the antenna elements, the numbers of antenna elements in a row direction and a column direction may be modified (for example, two rows and eight columns, eight rows and two columns, or the like). As described above, various arrangement patterns may be set as an arrangement of the antenna elements in the antenna array 100a, and the technology of the second embodiment is applicable to such various arrangement patterns.

To simplify description, a case of the one-dimensional arrangement illustrated in (A) of FIG. 2 (an arrangement pattern in which sixteen antenna elements are arranged in one line) will be described as an example.

(Relationship Between Number of Antenna Elements that Form Beam and Beam Width)

Figure 3:
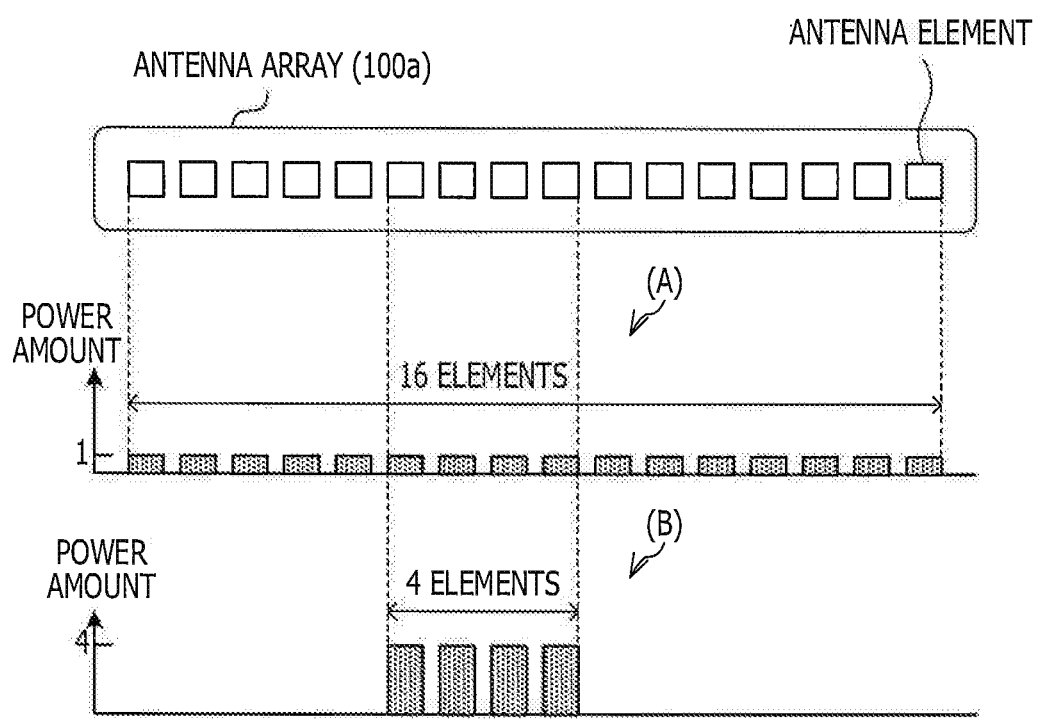
FIG. 3 is a first diagram illustrating a relationship between the number of antenna elements that form a beam and a width of the beam.
Figure 4:
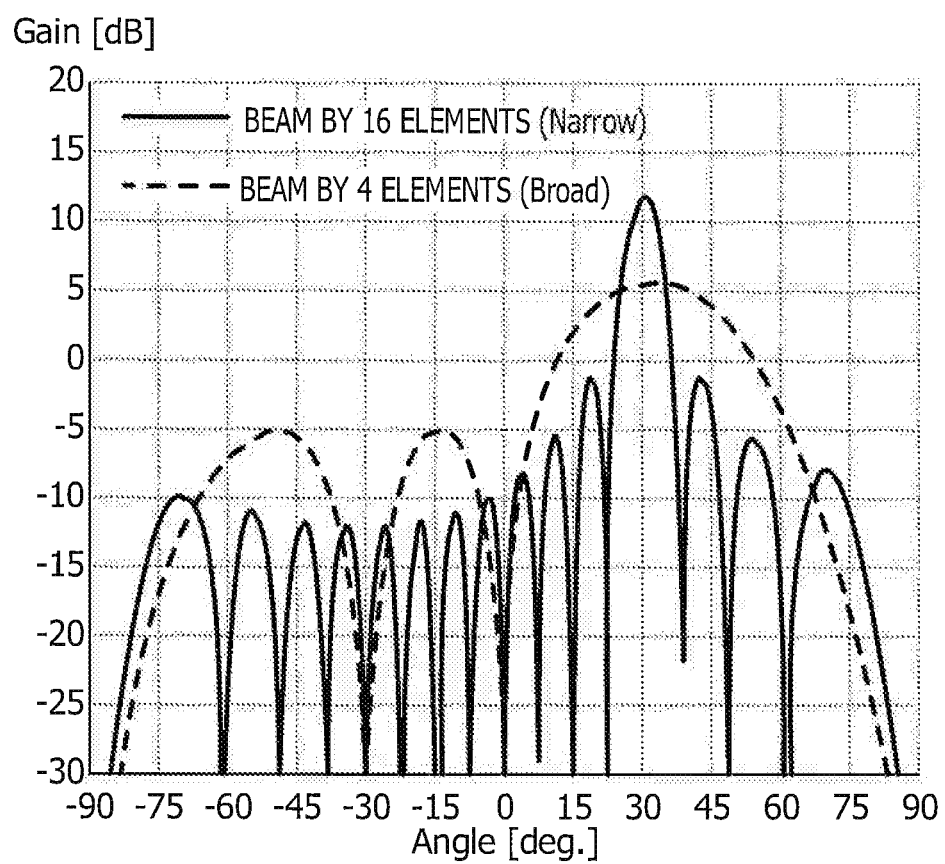
FIG. 4 is a second diagram illustrating a relationship between the number of antenna elements that form a beam and a width of the beam.

With reference to FIG. 3 and FIG. 4, a relationship between the number of antenna elements that form a beam and a beam width will be further described. FIG. 3 is a first diagram illustrating a relationship between the number of antenna elements that form a beam and a width of the beam. FIG. 4 is a second diagram illustrating the relationship between the number of antenna elements that form a beam and a width of the beam.

In FIG. 3, setting examples of a power amount that is supplied to each antenna element in the antenna array 100a are illustrated. (A) of FIG. 3 illustrates how a power amount of one unit is supplied to all of the sixteen antenna elements included in the antenna array 100a. On the other hand, (B) of FIG. 3 illustrates how a power amount of four units is supplied to four antenna elements in the antenna array 100a.

A gain of a beam (a beam formed by sixteen elements) which is formed by the antenna array 100a when the setting example of (A) of FIG. 3 is employed is as illustrated by a graph indicated by a solid line in FIG. 4. On the other hand, a gain of a beam (a beam formed by four elements) which is formed by the antenna array 100a when the setting example of (B) of FIG. 3 is employed is as illustrated by a graph represented by a dotted line in FIG. 4. Note that, in this example, a beam is steered in a direction of 30 decrees.

When the two graphs illustrated in FIG. 4 are compared to one another, a width of a main beam (gain—10 dB width) with a direction of 30 degrees as a center is about 15 degrees on the solid line graph and about 60 degrees on the dotted line graph. As described above, as the number of antenna elements that form a beam reduces, a width of a beam increases. Using this characteristic, a risk that, when beam tracking is performed, the wireless terminals 201 and 202 go off from a direction of a beam and a throughput is rapidly reduced may be reduced by forming a beam (a broad beam) with a wide width.

Incidentally, in the examples of FIG. 3, total sums of power amounts that are supplied to the antenna elements that form a beam are set to be equal. When power amounts are set in such a manner, as illustrated in FIG. 4, a gain that is close to that in a case of a beam (a narrow beam) with a narrow beam width may be achieved also by a broad beam. However, when the number of the antenna elements is ¼, the power amount that is supplied to each of the antenna elements is four times larger. Therefore, a power load that is applied to each of the antenna elements is increased. An antenna element that is resistant against a high-power load is relatively expensive, and therefore, increase in cost possibly occurs.

Considering the foregoing, in the wireless communication system 50 according to the second embodiment, a method for forming a broad beam with which a gain close to a gain that is achieved with a narrow beam is achieved while reducing increase in load that is applied to each antenna element is introduced.

In the above-described method, the base station 100 divides the antenna array 100a into a plurality of element blocks to perform BF independently in each of the element blocks, and also, orthogonalizes signals that are transmitted by the plurality of element blocks. At a reception side (the wireless terminals 201 and 202), it is possible to synthesize signals that are transmitted by the plurality of element blocks at the time of reception and therefore, a high gain may be achieved.

Also, in the above-described method, all of the antenna elements included in the antenna array 100a are used. Therefore, the power amount that is supplied to each antenna element may be the same as a power amount that is supplied to each antenna element when a narrow beam is formed. Therefore it is enabled to reduce increase in power load that is applied to each antenna element when a broad beam is formed. The above-described method and a function of the base station 100 that is able to realize the above-described method will be further described below.

(Hardware)

Figure 5:
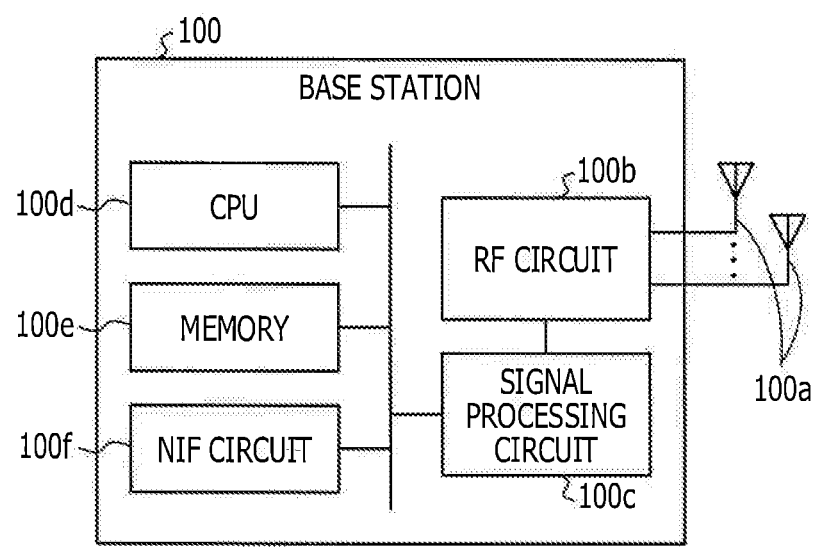
FIG. 5 is a block diagram illustrating an example of a hardware that is able to realize a function of a base station.

In advance of describing a function of the base station 100 or the like, with reference to FIG. 5 and FIG. 6, hardwares of the base station 100 and the wireless terminals 201 and 202 will be described. The base station 100 includes, for example, a hardware illustrated in FIG. 5. FIG. 5 is a block diagram illustrating an example of a hardware that is able to realize a function of a base station.

As illustrated in FIG. 5, the base station 100 includes the antenna array 100a, an RF circuit 100b, a signal processing circuit 100c, a CPU 100d a memory 100e, and a network interface (NIF) circuit 100f.

The antenna array 100a includes a plurality of antenna elements that are used for transmission and reception of an RF signal. The RF circuit 100b executes processing, such as transmission and reception of an RF signal which are performed by the antenna array 100a, frequency conversion, AD and DA conversion processing, or the like. Also, the RF circuit 100b includes a plurality of phase shifters that shift a phase of an RF signal for BF. The signal processing circuit 100c executes modulation and demodulation processing, spreading processing, or the like. The NIF circuit 100f is a communication circuit that is coupled to a core network.

The CPU 100d performs coding or decoding of data, control of the RF circuit 100b and the signal processing circuit 100c, control of a communication by the NIF circuit 100f, or the like. The CPU 100d may be replaced with DSP, ASIC, FPGA, or the like. The memory 100e is a storage device, such as, for example, RAM, a read only memory (ROM), HDD, SSD, or the like. For example, information, such as a BF weight, a spread code or the like, may be stored in the memory 100e.

Figure 6:
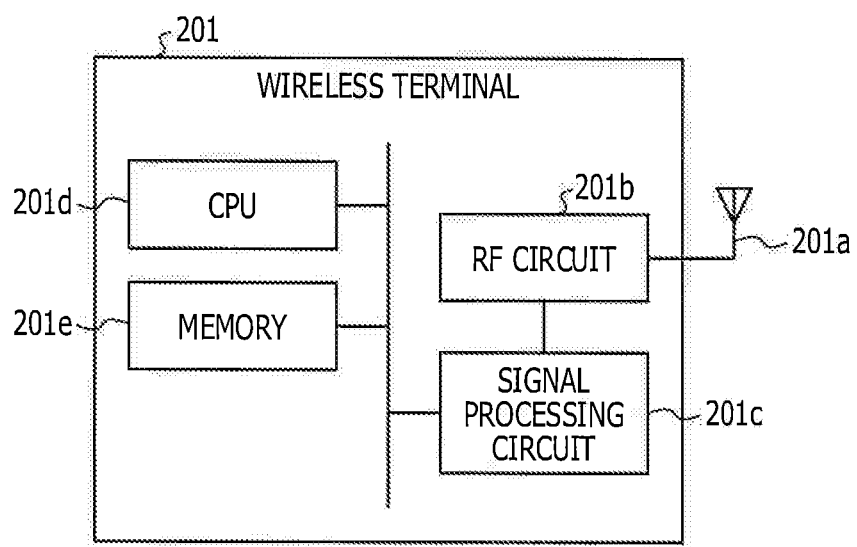
FIG. 6 is a block diagram illustrating an example of a hardware that is able to realize a function of a wireless terminal.

The wireless terminal 201 includes, for example, a hardware illustrated in FIG. 6. FIG. 6 is a block diagram illustrating an example of a hardware that is able to realize a function of a wireless terminal. Note that a function of the wireless terminal 202 is also realizable by the same hardware as that of the wireless terminal 201.

As illustrated in FIG. 6, the wireless terminal 201 includes an antenna 201a, an RF circuit 201b, a signal processing circuit 201c, a CPU 201d, and a memory 201e. Note that the number of antennas included in the wireless terminal 201 may be two or more.

The antenna 201a is an antenna that is used for transmission and reception of an RF signal. The RF circuit 201b executes processing, such as transmission and reception of an RF signal which are performed by the antenna 201a, frequency conversion, AD and DA conversion processing, or the like. When the number of antennas is two or more, the RF circuit 201b may include a plurality of phase shifters that shift a phase of an RF signal for BF. The signal processing circuit 201c executes modulation and demodulation processing, inverse spreading processing, or the like.

The CPU 201d performs coding or decoding of data, control of the RF circuit 201b and the signal processing circuit 201c, or the like. The CPU 201d may be replaced with DSP, ASIC, FPGA, or the like. The memory 201e is a storage device, such as, for example, RAM, ROM, HDD, SSD, or the like. For example, information, such as a BF weight, a spread code, or the like, may be stored in the memory 201e.

The wireless communication system 50 has been described above.

2-2. Function

Next, functions of the base station 100 and the wireless terminal 201 will be described. Note that, assuming that the functions of the wireless terminals 201 and 202 are the same, the description of the function of the wireless terminal 202 will be omitted.

(Function of Base Station)

Figure 7:
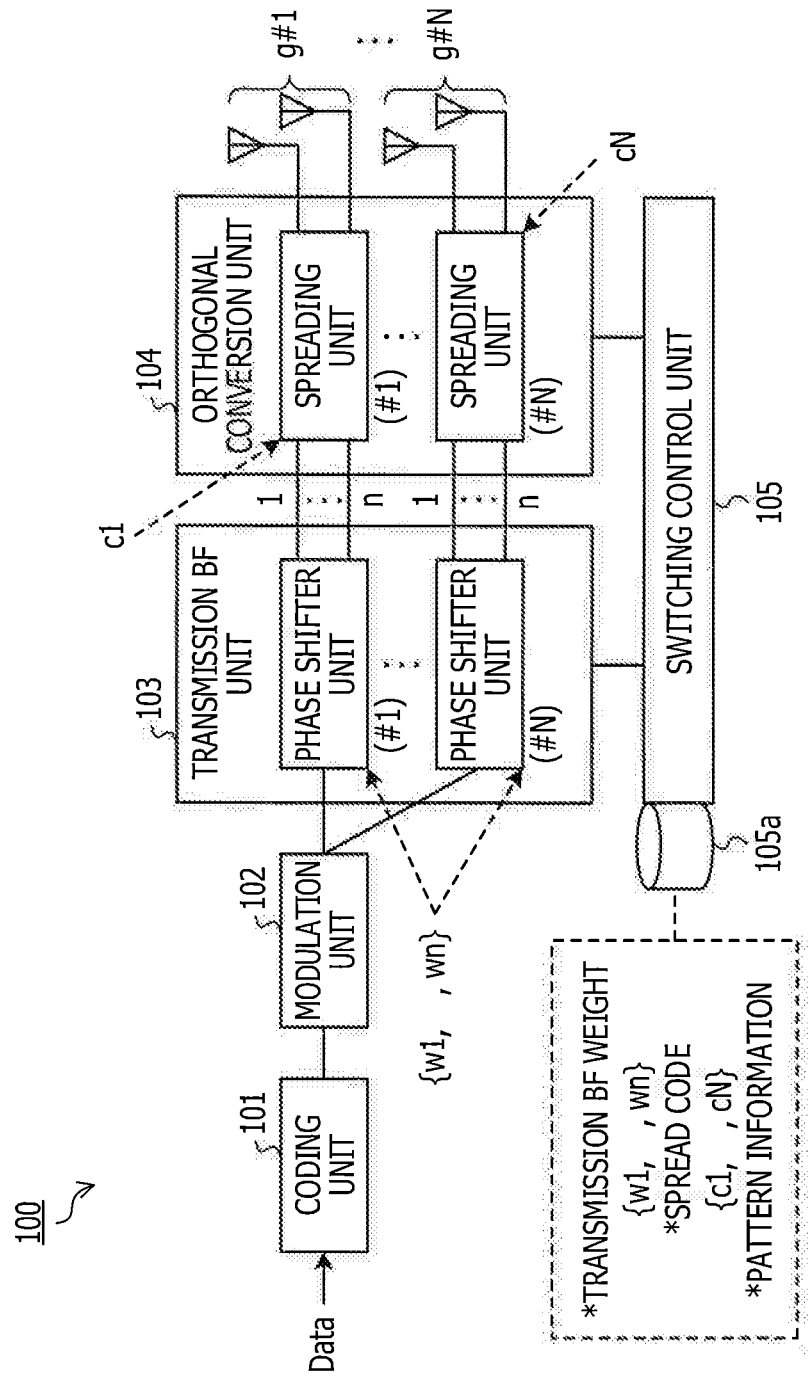
FIG. 7 is a block diagram illustrating an example of a function of a base station.

With reference to FIG. 7, a function of the base station 100 will be described. FIG. 7 is a block diagram illustrating an example of a function of a base station.

As illustrated in FIG. 7, the base station 100 includes a coding unit 101, a modulation unit 102, a transmission BF unit 103, an orthogonal conversion unit 104, and a switching control unit 105. The switching control unit 105 is coupled to a storage unit 105a.

Note that functions of the coding unit 101 and the switching control unit 105 may be realized, for example, by the CPU 100d. A function of the modulation unit 102 may be realized, for example, by the signal processing circuit 100c. Functions of the transmission BF unit 103 and the orthogonal conversion unit 104 may be realized, for example, by the RF circuit 100b and the signal processing circuit 100c. A function of the storage unit 105a may be realized, for example, by the memory 100e.

The coding unit 101 codes data using an error correction code, such as a Turbo code or the like. Data after being coded is output to the modulation unit 102. The modulation unit 102 modulates the data after being coded by a predetermined modulation method to generate a transmission signal. As a modulation method, for example, BPSK, QPSK, 16QAM, 64QAM, or the like may be used. The transmission signal is input to the transmission BF unit 103.

The transmission BF unit 103 includes phase shifter units #1, . . . , and #N. N is an element block number when the antenna array 100a is divided into a plurality of element blocks (groups of antenna elements, each of which includes two or more antenna elements). For each of the phase shifter units #1, . . . , and #N, a group {w1, . . . , or wn} of transmission BF weights that correspond to the same direction is set. n is the number of antenna elements that are included in an element block. The same transmission signal is input to the phase shifter units #1, . . . , and #N.

Note that, in the example of FIG. 7, the antenna array 100a is divided into element blocks g#1, . . . , and g#N. Also, the number of the antenna elements included in each of the element blocks g#1, . . . , and g#N is n. In this case, the same transmission BF group {w1, . . . , or wn} is set for the phase shifter units #1, . . . , and #N. However, when there is an element block g#q the number of antenna elements of which is m (m≠n), m transmission BF weights are set for a phase shifter unit #q that corresponds to the element block g#q.

A phase shifter unit #k (k=1, . . . , or N) distributes a transmission signal to n routes and multiplies a transmission signal of each route by a transmission BF weight to shift a phase. The transmission signal after being phase-shifted is output to the orthogonal conversion unit 104.

The orthogonal conversion unit 104 includes spreading units #1, . . . , and #N that correspond to the phase shifter units #1, . . . , and #N, respectively. A spread code ck is set for a spreading unit #1k (k=1, . . . , or N). The spreading unit #k multiplies n transmission signals that have been output from the phase shifter #k by the spread code ck. The n transmission signals that are output from the phase shifter #k are transmitted from the n antenna elements included in the element block g#k.

A transmission signal (i=1, . . . , or N) which is transmitted from an element block g#i and a transmission signal that is transmitted from an element block g#j (i≠j) are orthogonalized by the spread codes c1, . . . , and cN. That is, N beams that are formed by the element blocks g#1, . . . , and g#N are in a state of being code division multiplexed (CDM). Note that, even when there is the element block g#q the number of antenna elements of which is m (m≠n), orthogonalization processing is executed in accordance with similar procedures to those described above.

The switching control unit 105 controls operations of the transmission BF unit 103 and the orthogonal conversion unit 104. For example, the switching control unit 105 acquires a transmission BF weight from the storage unit 105a and sets the transmission BF weight for the phase shifter unit #k (k=1, . . . , or N). Also, the switching control unit 105 acquires a spread code from the storage unit 105a and sets the spread code for the spreading unit #k. Also, the switching control unit 105 sets a division pattern of the antenna array 100a in accordance with a moving state of a transmission destination (for example, the wireless terminal 201).

For example, if the moving speed of the wireless terminal 201 is larger than a predetermined threshold, the switching control unit 105 divides the antenna array 100a into the element blocks g#1, . . . , and g#N and performs orthogonalization using the phase shifter units #1, . . . , and #N and the spreading units #1, . . . , and #N. On the other hand, if the moving speed of the wireless terminal 201 is not larger than the predetermined threshold, the switching control unit 105 performs BF using all of the antenna elements included in the antenna array 100a. In this case, orthogonalization using the spreading units #1, . . . , and #N is omitted.

Note that, for example, the predetermined threshold is set for the moving speed at which an acceptable throughput is achieved by beam tracking in a control mode (a narrow beam (NB) control mode) in which BF is performed using all of the antenna elements included in the antenna array 100a in advance. In the description below, a control mode in which the antenna array 100a is divided into the element blocks g#1, . . . , and g#N and BF by the phase shifter units #1, . . . , and #N and orthogonalization by the spreading units #1, . . . , and #N are performed is sometimes called broad beam (BB) control mode.

As described above, the switching control unit 105 switches between an NB control mode and a BB control mode in accordance with the moving speed of a transmission destination. Also, the switching control unit 105 may be configured to further switch, when an operation is controlled in a BB control mode, the division pattern of the antenna array 100a. For example, the switching control unit 105 may be configured to acquire information (pattern information) of the division pattern from the storage unit 105a and select a division pattern in accordance with the moving speed of the transmission destination, based on the pattern information. Note that the division pattern will be further described below.

The base station 100 has the above-described function.

(Function of Wireless Terminal)

Figure 8:
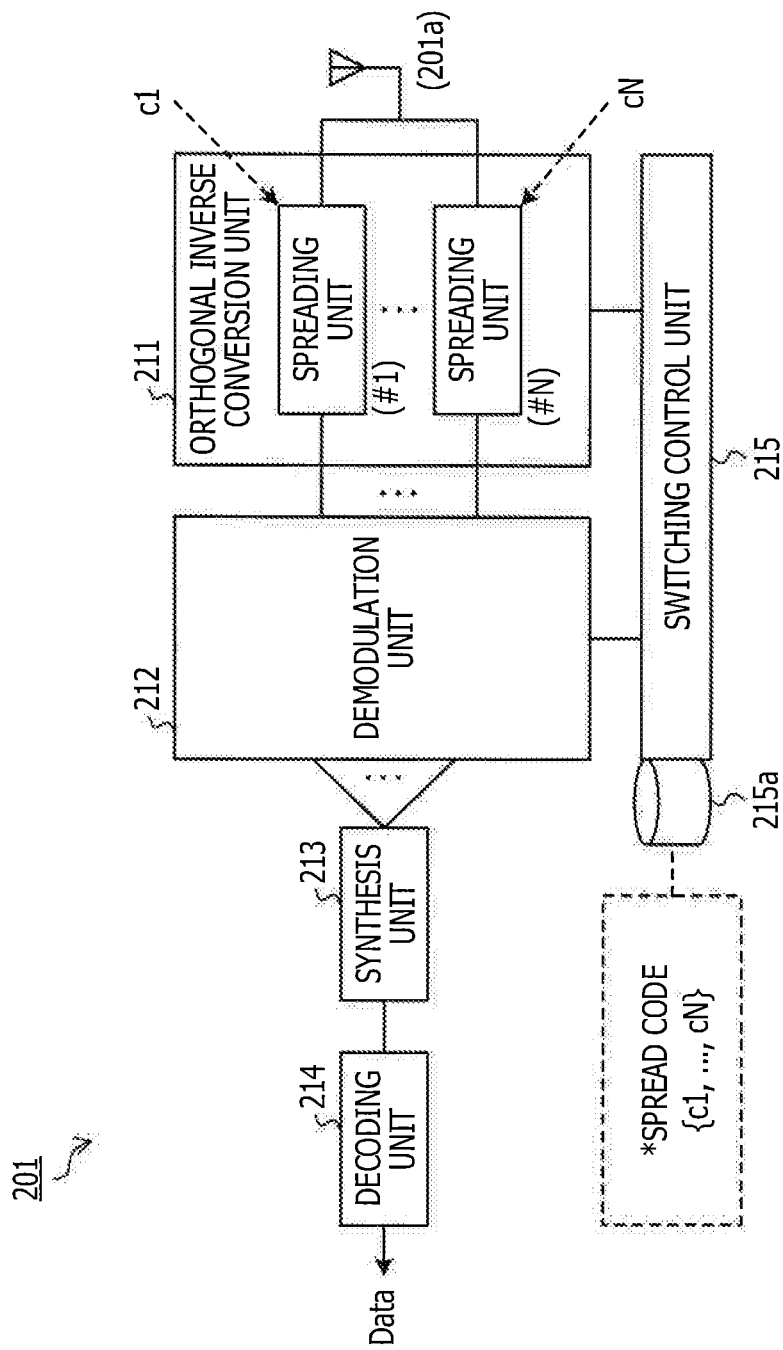
FIG. 8 is a block diagram illustrating an example of a function of a wireless terminal.

Next, with reference to FIG. 8, a function of the wireless terminal 201 will be described. FIG. 8 is a block diagram illustrating an example of a function of a wireless terminal.

As illustrated in FIG. 8, the wireless terminal 201 includes an orthogonal inverse conversion unit 211, a demodulation unit 212, a synthesis unit 213, a decoding unit 214, and a switching control unit 215. The switching control unit 215 is coupled to a storage unit 215a.

Note that a function of the orthogonal inverse conversion unit 211 may be realized, for example, by the RF circuit 201b and the signal processing circuit 201c. Functions of the demodulation unit 212 and the synthesis unit 213 may be realized, for example, by the signal processing circuit 201c. Functions of the decoding unit 214 and the switching control unit 215 may be realized, for example, by the CPU 201d.

The orthogonal inverse conversion unit 211 includes inverse spreading units #1, . . . , and #N. N is a division number (the number of element blocks) of the antenna array 100a. A signal (a reception signal) that has been received by the antenna 201a is input to the inverse spreading units #1, . . . , and #N. The above-described spread code ck is set for an inverse spreading unit #k (k=1, . . . , or N). The inverse spreading unit #k inverse-spreads the reception signal using the spread code ck to restore a signal before being spread. The signal before being spread is output to the demodulation unit 212.

The demodulation unit 212 demodulates each of signals before being spread, which are output from the inverse spreading units #1, . . . , and #N, to generate reception data. The reception data that corresponds to each of the inverse spreading units #1, . . . , and #N is output to the synthesis unit 213. The synthesis unit 213 synthesizes the reception data that is output from the demodulation unit 212 to generate synthesized data. The synthesized data is output to the decoding unit 214. The decoding unit 214 performs decoding processing, such as error correction, on the synthesized data or the like, to restore data that has been transmitted from the base station 100.

When the base station 100 controls transmission in a BB control mode, the switching control unit 215 performs inverse spreading by the orthogonal inverse conversion unit 211 and synthesis of data by the synthesis unit 213 in the manner described above. For example, the switching control unit 215 acquires a spread code from the storage unit 215a and sets the spread code for the inverse spreading units #1, . . . , and #N. On the other hand, when the base station 100 controls transmission in a NB control mode the switching control unit 215 omits inverse spreading by the orthogonal inverse conversion unit 211 and synthesis of data by the synthesis unit 213.

For example, at the time of transition, a control mode of the base station 100 is notified from the base station 100 to the wireless terminal 201 or is autonomously determined by the wireless terminal 201, based on a moving state of the wireless terminal 201 itself. As a method in which the control mode is autonomously determined by the wireless terminal 201, a method in which a moving speed is detected by GPS or an accelerator sensor or based on a result of detection of a preferable beam direction or the like and, if the moving speed is larger than a predetermined threshold, a BB control mode is determined may be used.

The wireless terminal 201 has the above-described function.

(Method in which Broad Beam with High Gain is Formed Using Plurality of Element Blocks)

Figure 9:
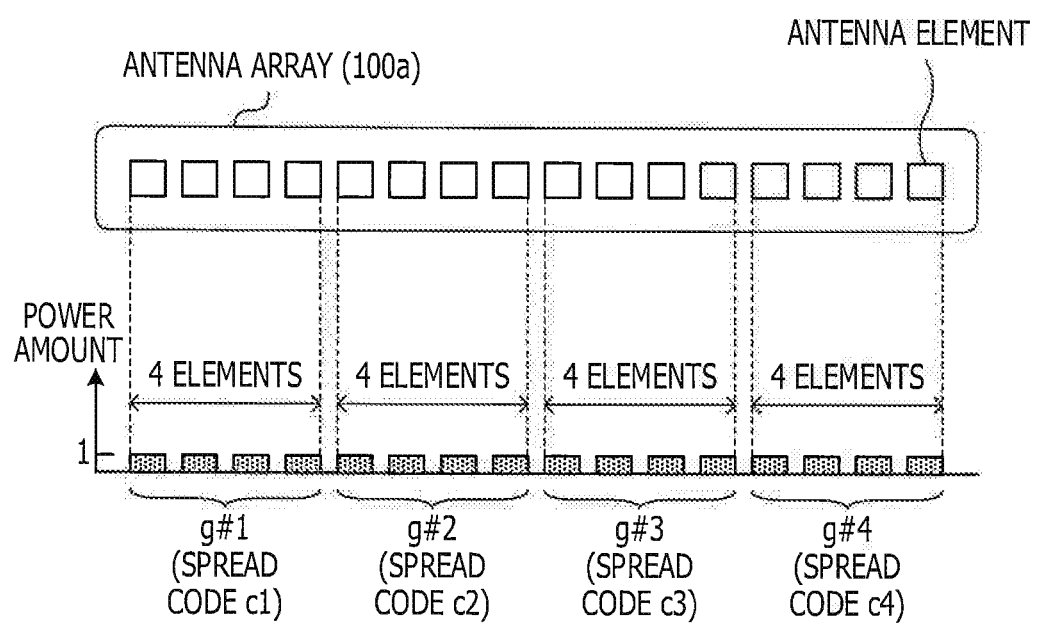
FIG. 9 is a first diagram illustrating a method for forming a broad beam with a high gain using a plurality of element blocks.
Figure 10:
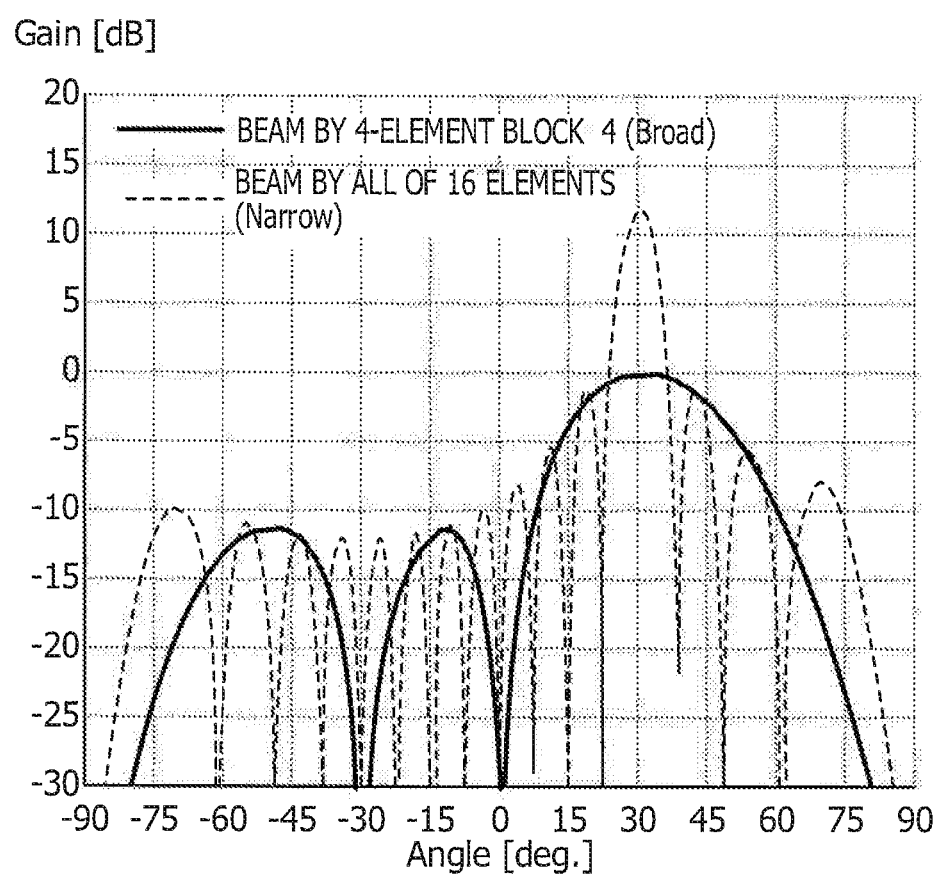
FIG. 10 is a second diagram illustrating a method for forming a broad beam with a high gain using a plurality of element blocks.

With reference to FIG. 9 and FIG. 10, a method in which a broad beam with a high gain is formed using the antenna array 100a will be described below.

FIG. 9 is a first diagram illustrating a method for forming a broad beam with a high gain using a plurality of element blocks. FIG. 10 is a second diagram illustrating a method for forming a broad beam with a high gain using a plurality, of element blocks.

As described above, the base station 100 divides the antenna array 100a into the element blocks g#1, . . . , and g#N in a BB control mode and puts a beam that is formed by the element blocks g#1, . . . , and g#N in a state of CDM using a spread code. Also, the power amount that is supplied to each antenna element of the antenna array 100a is set to be the same power amount as that when an operation is performed in an NB mode.

For example, when the antenna array 100a is divided into the four element blocks g#1, . . . , and g#4 each including four elements (see FIG. 9), an angle distribution of a gain is as indicated by a graph of a solid line illustrated in FIG. 10. Note that, in the example of FIG. 10, a direction of a beam is set to be 30 degrees. In FIG. 10, for comparison, an angle distribution of a gain when transmission is performed in an NB mode is indicated by a dotted line.

When the two graphs illustrated in FIG. 10 are compared to one another, in a case of a BB control mode, a beam width that is wider than that in a case of an NB mode is realized. For example, in a position in which a gain is −10 dB, the beam width in the NB control mode is about 15 degrees (see the dotted line), the beam width in the BB control mode is about 53 degrees (see the solid line), and a broad beam is achieved in the BB control mode. Also, it is possible to achieve a gain that is close to that in an NB control mode also in a BB control mode.

That is, with the functions (division and orthogonalization of the antenna array 100a) of the base station 100 and the wireless terminal 201 described above, it is possible to form a broad beam with a sufficient gain without increasing the power amount that is supplied to each antenna element. Note that a signal that is transmitted by the element block g#k (k=1, . . . , or 4) is spread using the spread code ck (see FIG. 9).

(Setting and Switching of Division Pattern)

Figure 11:
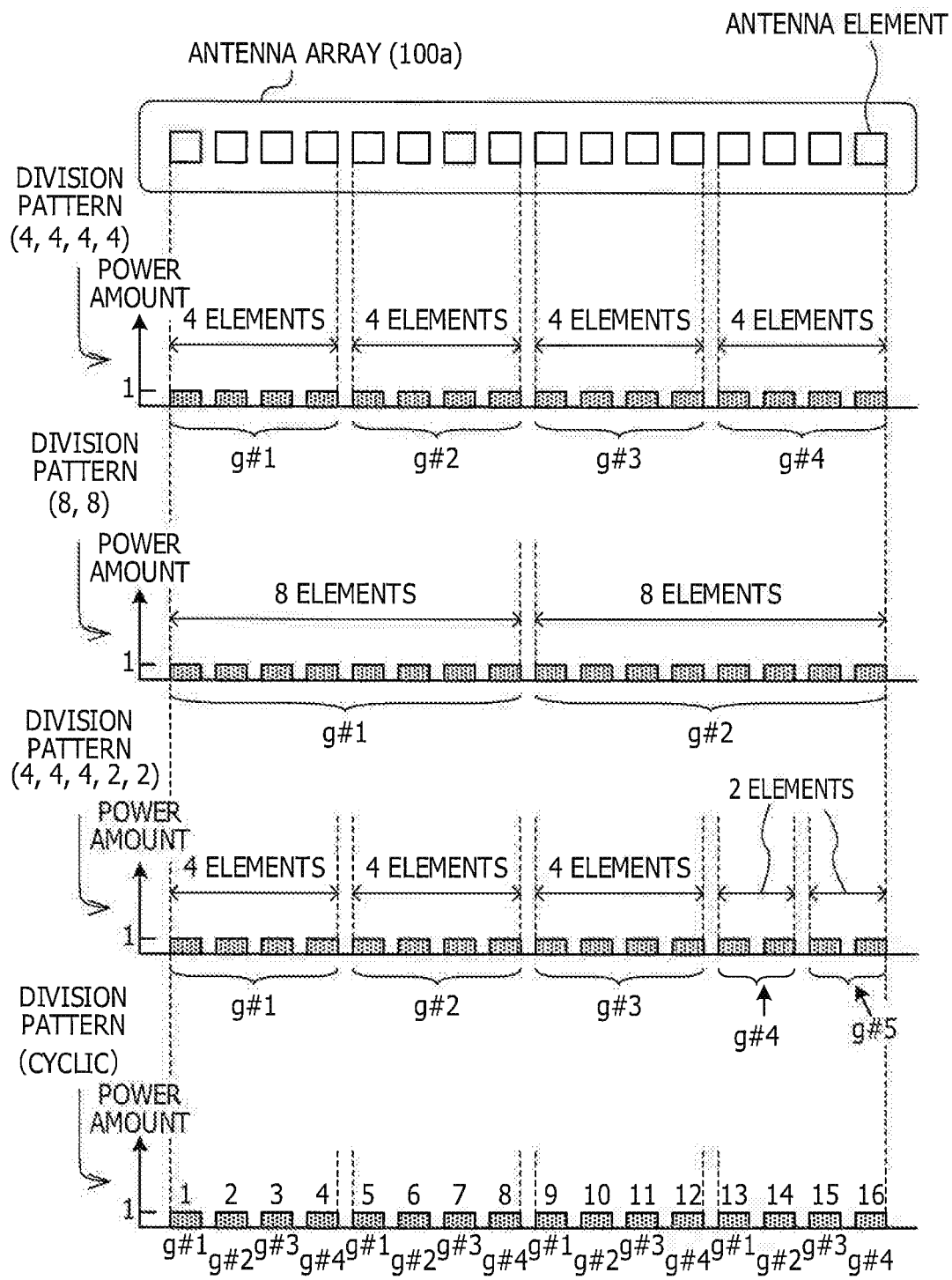
FIG. 11 is diagram illustrating setting examples of division patterns.
Figure 13:
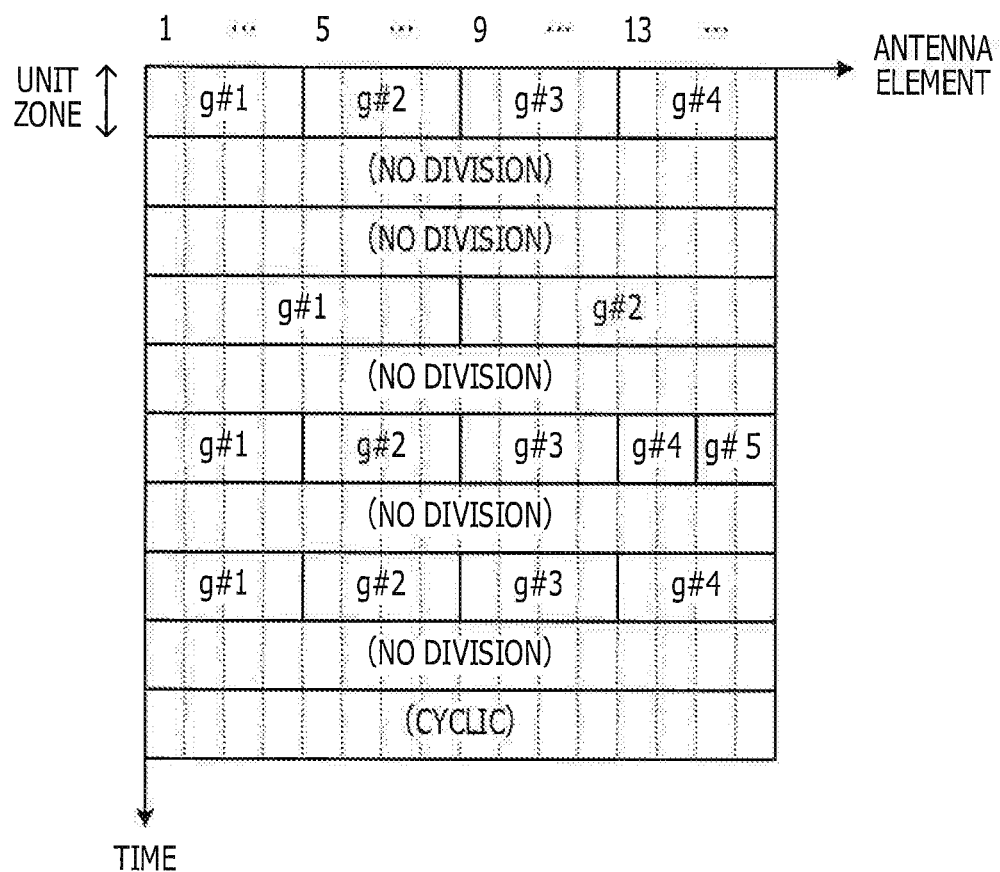
FIG. 13 is a diagram illustrating of division pattern switching control.

With reference to FIG. 11 to FIG. 13, setting and switching of a division pattern will be described below. Note that FIG. 11 is diagram illustrating setting examples of division patterns. FIG. 12 is a diagram illustrating an example of pattern information. FIG. 13 is a diagram illustrating division pattern switching control.

In FIG. 11, four types of division patterns are illustrated as examples. Note that a division pattern to which the technology of the second embodiment is applicable is not limited to the examples of FIG. 11. For example, in accordance with the number of antenna elements included in the antenna array 100a and the arrangement pattern of the antenna elements setting of more various division patterns is possible. However, for convenience of description, the four types of division patterns illustrated in FIG. 11 will be described as examples.

In FIG. 11, a division pattern (4, 4, 4, 4) in which the antenna array 100a is divided into the four element blocks g#1, . . . , and g#4 each of which includes four antenna elements is illustrated. Also, a division pattern (8, 8) in which the antenna array 100a is divided into the two element blocks g#1 and g#2 each of which includes eight antenna elements is illustrated.

In the division pattern (4, 4, 4, 4), the number of antenna elements included in each element block is four. Therefore, as compared to the division pattern (8, 8) in which the number of antenna elements included in each element block is eight, a beam width of the division pattern (4, 4, 4, 4) is wider. On the other hand, the division pattern (8, 8) has an advantage that a higher gain is achieved, as compared to the division pattern (4, 4, 4, 4).

In FIG. 11, a division pattern (4, 4, 4, 2, 2) in which the antenna array 100a is divided into the three element blocks g#1, . . . , and g#3 each of which includes four antenna elements and the two element blocks g#4 and g#5 each of which includes two antenna elements is illustrated. As described above, element blocks the number of antenna elements of which are different may be mixed.

In FIG. 11, a division pattern (cyclic) in which the antenna array 100a is divided into the four element blocks g#1, . . . , and g#4 each of which includes four antenna elements is illustrated. However, the division pattern (cyclic) is not a division pattern in which each of the element blocks is formed by a plurality of antenna elements that are continuously arranged but a division pattern in which each of the element blocks is formed by a plurality of antenna elements located in intermittent positions.

In the division pattern (cyclic) illustrated in FIG. 11, the first, fifth, ninth, and thirteenth antenna elements are set for the element block g#1 and the second, sixth, tenth, and fourteenth antenna elements are set for the element block g#2. Furthermore, the third, seventh, eleventh and fifteenth antenna elements are set for the element block g#3 and the fourth, eight, twelfth, and sixteenth antenna elements are set for the element block g#4.

That is, the above-described division pattern (cyclic) is a division pattern in which an antenna element group in which an antenna element of the element block g#1, an antenna element of the element block g#2, an antenna element of the element block g#3, and an antenna element of the element block g#4 are arranged repeatedly appears. In this case, an interval between the antenna elements included in the same element block is increased four times.

Pattern information that correctively includes the above-described division patterns is as illustrated in FIG. 12. However, the pattern information of FIG. 12 includes information (a section of "NO DIVISION") when the antenna array 100a is not divided. A state of "NO DIVISION" corresponds to an NB control mode. On the other hand, each of the division patterns (4, 4, 4, 4), (8, 8), (4, 4, 4, 2, 2), and (cyclic) corresponds to a BB control mode.

In an element block section, a combination of antenna elements that belong to each element block is described. For example, in an element block section that corresponds to the division pattern (4, 4, 4, 4), information of {1, 2, 3, 4} is included. {1, 2, 3, 4} indicates that the first, second, third, and fourth antenna elements are included in the same element block. In the example of FIG. 11, {1, 2, 3, 4} corresponds to the element block g#1. The pattern information is stored in the storage unit 105a (see FIG. 7), and thereby, switching of a division pattern is simplified.

For example, as illustrated in FIG. 13, the switching control unit 105 may be configured to switch a division pattern with time. In the example of FIG. 13, a division pattern is controlled for each unit zone. The abscissa indicates an index (a number that indicates which position an antenna element is located) and the ordinate indicates time. Note that, as the unit zone, a frame, a subframe, a slot, a time zone of a length that has been set in advance, or the like may be used.

In the example of FIG. 13, the division pattern (4, 4, 4, 4) is used in a first unit zone and an NB control mode (NO DIVISION) is used in next two unit zones. Furthermore, switching control is performed in the order of the division pattern (8, 8), an NB control mode (NO DIVISION), the division pattern (4, 4, 4, 2, 2), an NB control mode (NO DIVISION), and the division pattern (4, 4, 4, 4). For example, when a change of a transmission destination itself or a change in moving state of a transmission destination occurs, switching control illustrated in FIG. 13 may be performed.

Functions of the base station 100 and the wireless terminal 201 have been descried above.

2-3. Flow of Processing

Next, a flow of processing that is executed by the base station 100 and the wireless terminal 201 will be described.

(Processing of Base Station)

Figure 14:
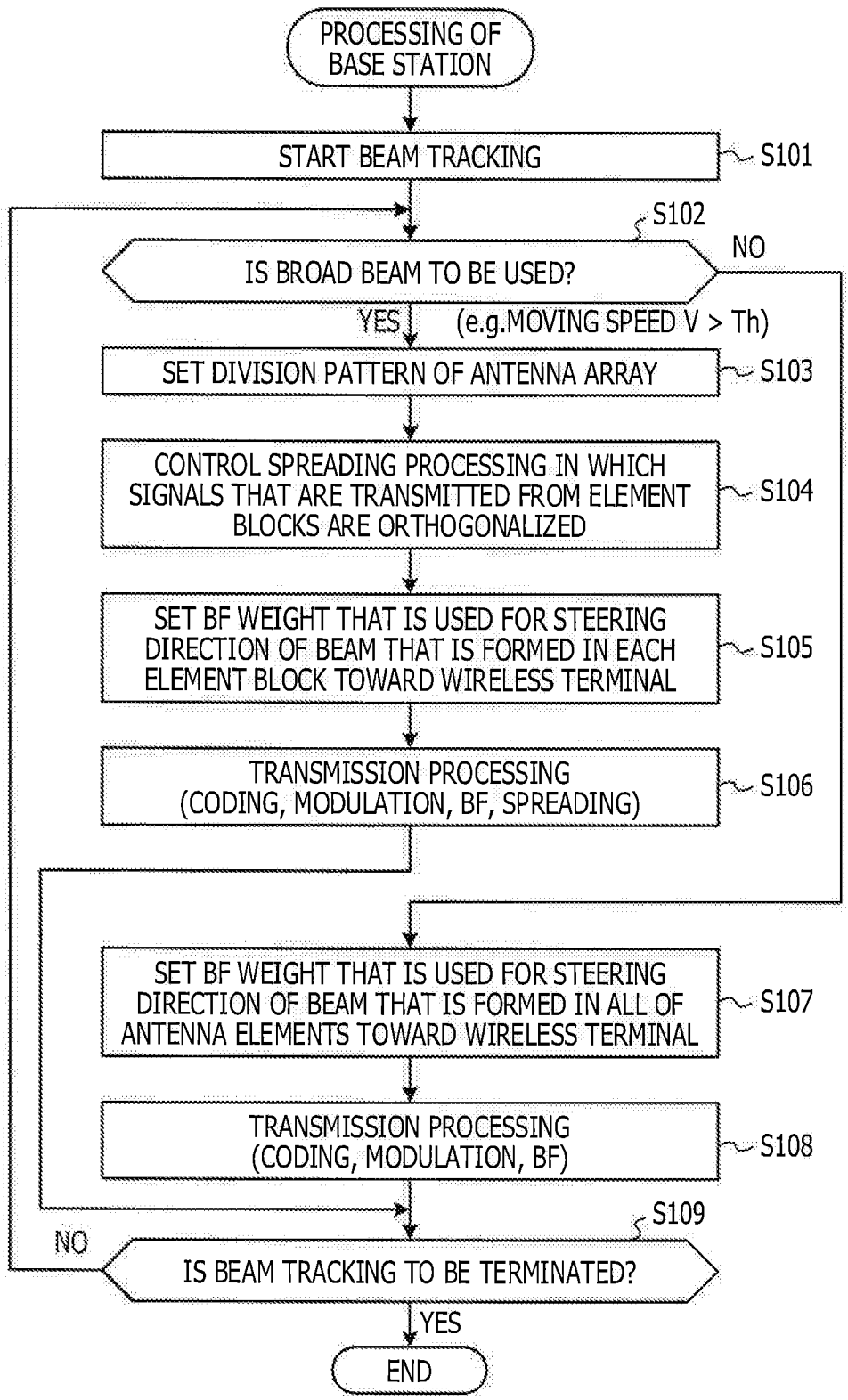
FIG. 14 is a flowchart illustrating a flow of processing that is executed in a base station.

With reference to FIG. 14, processing that is executed by the base station 100 will be described. FIG. 14 is a flowchart illustrating a flow of processing that is executed by a base station.

(S101) The switching control unit 105 starts beam tracking. For convenience of description, beam tracking in which the wireless terminal 201 is caused to track a beam will be described as an example.

When beam tracking is started, the switching control unit 105 regularly acquires information of a beam direction (a selected beam direction) in which reception power is large from the wireless terminal 201. Then, the switching control unit 105 controls a direction of a beam that is formed by the antenna array 100a, based on the information of the selected beam direction, which is acquired from the wireless terminal 201.

(S102) The switching control unit 105 determines whether or not a broad beam is to be used for transmission to wireless terminal 201.

For example, the switching control unit 105 estimates moving speed V of the wireless terminal 201 from a change with time (angle speed) of the selected beam direction, based on the information of the selected beam direction, which is acquired from the wireless terminal 201. Then, the switching control unit 105 compares the estimated moving speed V and a predetermined threshold Th with one another and, if the moving speed V is larger than the threshold Th, the switching control unit 105 determines that a broad beam is to be used.

If the switching control unit 105 has determined that a broad beam is to be used for transmission to the wireless terminal 201, the process proceeds to S103. That is, the process proceeds to a process step of a BB control mode. Note that, in a case of an NB control mode, the mode is switched to a BB control mode. On the other hand, if the switching control unit 105 has determined that a broad beam is not to be used for transmission to the wireless terminal 201, the process proceeds to S107. That is, the process proceeds to a process step of an NB control mode. Note that, in a case of an BB control mode, the mode is switched to an NB control mode.

(S103) The switching control unit 105 sets a division pattern of the antenna array 100a, which is to be used for transmission.

For example, the switching control unit 105 refers to pattern information (see FIG. 12) in the storage unit 105a and selects a division pattern that is to be set from division patterns of a BB control mode. There is a tendency that a division pattern the number (a block number) of element blocks of which is large has a small number (element block size) of antenna elements that are included in each corresponding element block. Therefore, as the block number of the division pattern increases, a beam width thereof increases. Considering this characteristic, the switching control unit 105 may be configured to select a division pattern the block number of which increases as the moving speed of the wireless terminal 201 increases.

(S104) The switching control unit 105 sets a spread code that orthogonalizes a signal that is transmitted from each element block for the orthogonal conversion unit 104 (control of spreading processing). For example, the switching control unit 105 acquires spread codes $c1, \ldots,$ and cN for several blocks from the storage unit 105a and sets the spread codes $c1, \ldots,$ and cN for the spreading units #1, . . . , and #N of the orthogonal conversion unit 104 which correspond to the element blocks g#1, . . . , and g#N, respectively. Note that the orders of the S104 and S105 may be exchanged.

(S105) The switching control unit 105 sets a BF weight that is used for steering a direction of a beam that is formed by each element block toward the wireless terminal 201 for the transmission BF unit 103. For example, the switching control unit 105 acquires transmission BF weight groups $\{w1, \ldots,$ and wn$\}$ from the storage unit 105a and sets the transmission BF weight groups $\{w1, \ldots,$ and wn$\}$ to the phase shifter units #1, . . . , and #N of the transmission BF unit 103, which correspond to the element blocks g#1, . . . , and g#N, respectively.

Note that, as in the division pattern (4, 4, 4, 2, 2), if element blocks that have different element block sizes are included, the same transmission BF weight group is set for element blocks that have the same block size. For example, four transmission BF weight groups $\{w11, \ldots,$ and w14$\}$ are set for the element blocks the element block sizes each of which is four elements and two transmission BF weight groups $\{w21$ and w22$\}$ are set for the element blocks the element block sizes each of which is two elements.

(S106) The coding unit 101 codes data using an error correction code, such as a Turbo code or the like. Data after being coded is output to the modulation unit 102. The modulation unit 102 modulates the data after being coded by a predetermined modulation method (BPSK, QPSK, 16QAM, 64QAM, or the like) and generates a transmission signal. The transmission signal is output to the transmission BF unit 103.

The transmission BF unit 103 causes the phase shifter units #1, . . . , and #N to multiply transmission signals by the transmission BF weight groups and shift phases of the transmission signals. For example, the phase shifter #k (k=1, . . . , and N) multiplies a transmission signal that is output from a qth (q=1, . . . , and n) antenna element included in the element block g#k by a transmission BF weight wq and shifts a phase of the transmission signal. The transmission signal after being phase-shifted is output to the orthogonal conversion unit 104.

The orthogonal conversion unit 104 causes the spreading units #1, . . . , and #N to multiple the transmission signal after being phase-shifted by a spread code and orthogonalize beams that are formed by the element blocks g#1, . . . , and g#N. For example, n transmission signals after being phase-shifted, which are output from the phase shifter unit #k (k=1, . . . , and N), are input to the spreading unit #k. The phase shifter unit #k multiplies each of the transmission signals after being phase-shifted, which have been input, by the spread code ck. Then transmission signals that have been multiplied by the spread code ck are transmitted from the n antenna elements included in the element block g#k.

Each of beams that are formed by the element blocks g#1, . . . , and g#N is controlled and steered in a direction toward the wireless terminal 201 by the transmission BF weight groups. Beams that are formed by the element blocks g#1, . . . , and g#N are orthogonalized to one another by the spread codes $c1, \ldots,$ and cN and are put in a state of CDM. Because the element block size is smaller than a total number of antenna elements that are included in the antenna array 100a, a broad beam is formed. A high gain is achieved by performing inverse spreading and synthesis at a wireless terminal 201 side.

When processing of S106 is completed, the process proceeds to S109.

(S107) The switching control unit 105 sets a BF weight that is used for steering directions of beams that are formed by all of the antenna elements that are included in the antenna array 100a toward the wireless terminal 201. If the total number of antenna elements is m, the switching control unit 105 acquires transmission BF weight groups $\{w1, \ldots,$ and wm$\}$ from the storage unit 105a and sets the transmission BF weight groups $\{w1, \ldots,$ and wm$\}$ for the phase shifter unit #1 of the transmission BF unit 103.

(S108) The coding unit 101 codes data using an error correction code, such as a Turbo code or the like. Data after being coded is output to the modulation unit 102. The modulation unit 102 modulates the data after being coded by a predetermined modulation method (BPSK, QPSK, 16QAM, 64QAM, or the like) and generates a transmission signal. The transmission signal is output to the transmission BF unit 103.

For example, the transmission BF unit 103 distributes the transmission signal to m transmission signals and causes the phase shifter unit #1 to multiply the m transmission signals by the transmission BF weights w1, and wm and shift phases of the transmission signals. The transmission signals after being phase-shifted are transmitted from the antenna elements that are included in the antenna array 100a. In an NB control mode, processing of the orthogonal conversion unit 104 is omitted.

(S109) The switching control unit 105 determines whether or not beam tracking for the wireless terminal 201 is to be terminated. If beak tracking for the wireless terminal 201 is to be terminated, a series of processes illustrated in FIG. 14 ends. On the other hand, if beak tracking for the wireless terminal 201 is to be continued, the process proceeds to S102.

Processing that is executed by the base station 100 is as described above.

(Processing of Wireless Terminal)

Figure 15:
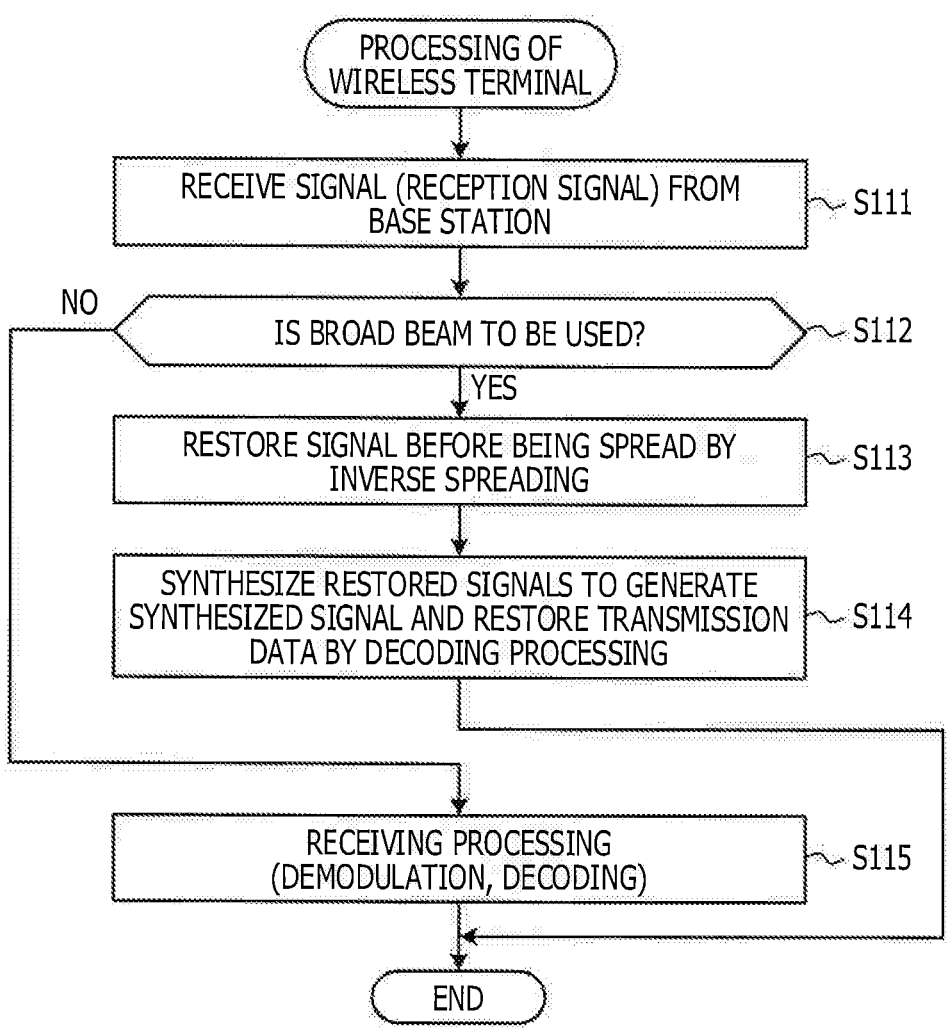
FIG. 15 is a flowchart illustrating a flow of processing that is executed in a wireless terminal.

Next, with reference to FIG. 15, processing that is executed by the wireless terminal 201 will be described. FIG. 15 is a flowchart illustrating a flow of processing that is executed by a wireless terminal. Note that, similarly, the wireless terminal 202 also executes processing in accordance with the flow illustrated in FIG. 15.

(S111) When the wireless terminal 201 receives a signal from the base station 100, the received signal (the reception signal) is output to the orthogonal inverse conversion unit 211 or the demodulation unit 212 from the antenna 201a. In a BB control mode, the reception signal is output to the orthogonal inverse conversion unit 211. In an NB control mode, the reception signal is output to the demodulation unit 212.

(S112) The switching control unit 215 determines whether or not a broad beam is to be used. Note that, as a determination method, for example a method in which whether or not a broad beam is to be used is determined in accordance with a notification from the base station 100, a method in which the wireless terminal 201 autonomously determines whether or not a broad beam is to be used, based on a moving state of the wireless terminal 201 itself, or the like may be used.

For example, as illustrated in FIG. 13, if a zone in which and a division pattern with which the base station 100 performs transmission in a BB control mode have been set and setting contents have been notified to the wireless terminal 201, the switching control unit 215 determines whether or not a broad beam is to be used, based on the setting contents.

When the base station 100 notifies the wireless terminal 201 of information of the control mode and the division pattern in switching the control mode or the division pattern, the switching control unit 215 determines whether or not a broad beam is to be used, based on the information of the control mode, which is being currently notified.

When whether or not a broad beam is to be used is autonomously determined in accordance with the moving speed of the self terminal, the switching control unit 215 detects the moving speed, based on an output of GPS, an accelerator sensor, or the like and determines, if the moving speed is larger than a predetermined threshold, that a broad beam is to be used. The threshold that is used for this determination is the same as the threshold Th that is used for determining whether or not the base station 100 uses a broad beam.

If it has been determined that a broad beam is to be used (in a BB control mode), the process proceed to S113. On the other hand if it has been determined that a broad beam is not to be used (in an NB control mode), the process proceeds to S115.

(S113) The switching control unit 215 sets a spread code in the orthogonal inverse conversion unit 211.

For example, if a division pattern in which the antenna array 100a is divided into the element blocks g#1, . . . , and g#N is used, the switching control unit 215 acquires the spread codes c1, . . . , and cN from the storage unit 215a and sets the spread codes c1, . . . , and cN for the inverse spread units #1, . . . , and #N of the orthogonal inverse conversion unit 211. The orthogonal inverse conversion unit 211 distributes a reception signal to the inverse spread units #1, . . . , and #N. The inverse spread unit #k (k=1, . . . , and N) inverse-spreads the reception signal using the spread code ck and restores a signal before being spread. The signal before being spread is output to the demodulation unit 212.

(S114) The demodulation unit 212 performs demodulation processing on the signal before being spread by a predetermined modulation method (BPSK, QPSK, 16QAM, 64QAM, or the like) to generate reception data. The reception data is output to the synthesis unit 213. The synthesis unit 213 synthesizes n pieces of reception data which correspond to the inverse spreading units #1, . . . , and #N to generate synthesis data. The synthesis data is output to the decoding unit 214. The decoding unit 214 restores the transmission data from the synthesized data by demodulation processing.

When processing of S114 is completed, a series of processes illustrated in FIG. 15 ends.

(S115) The demodulation unit 212 performs demodulation processing on the reception signal by a predetermined modulation method (BPSK, QPSK, 16QAM, 64QAM, or the like) to generate reception data. The reception data is output to the decoding unit 214. The decoding unit 214 restores the transmission data from the reception data by decoding processing. That is, in an NB control mode, processing of each of the orthogonal inverse conversion unit 211 and the synthesis unit 213 is omitted.

When processing of S115 is completed, a series of processes illustrated in FIG. 15 ends.

Processing that is executed by the wireless terminal 201 is as described above.

A flow of processing that is executed by each of the base station 100 and the wireless terminal 201 has been described.

2-4. Modified Examples

Modified examples of the second embodiment will be described below.

Modified Example #1: Control of Element Block Size

As a modified example #1, with reference to FIG. 16 and FIG. 17, a method in which an element block size (a division pattern) is controlled in accordance with a moving state of the wireless terminal 201 will be described.

Figure 16:
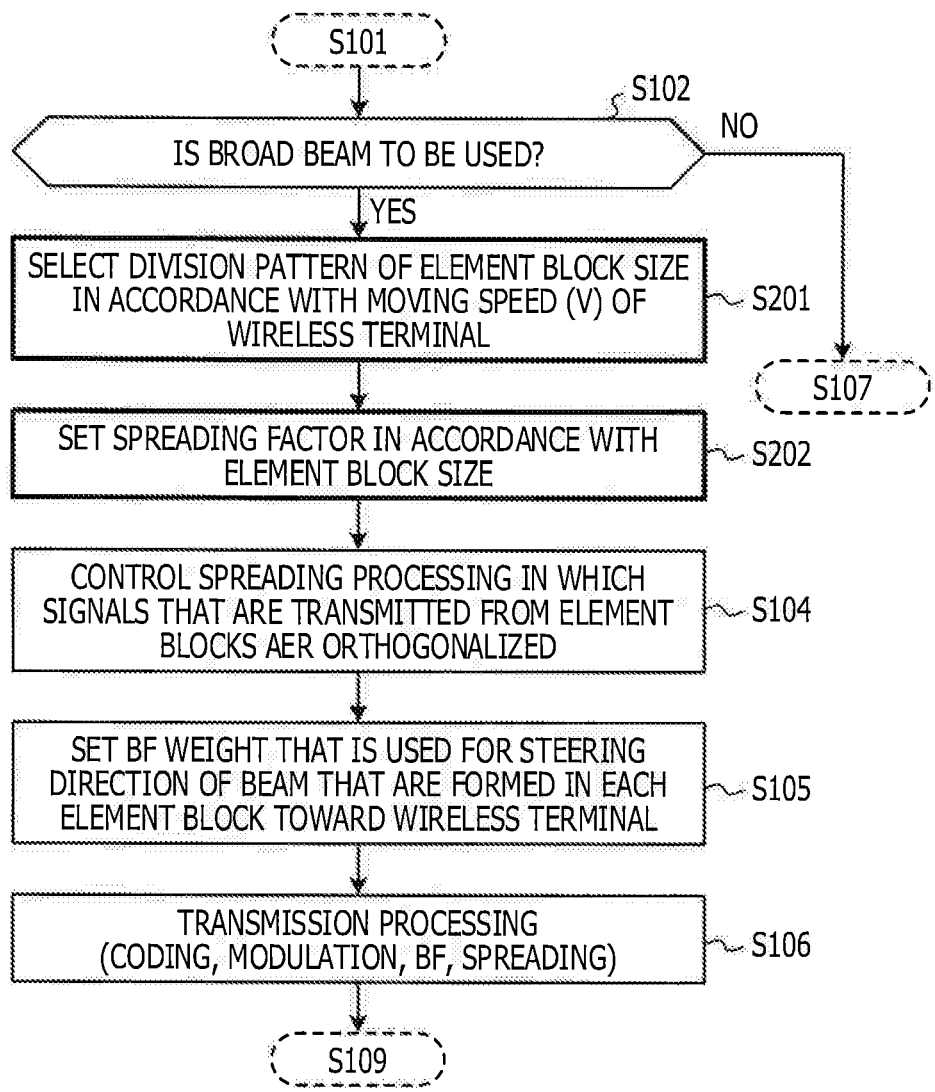
FIG. 16 is a flowchart illustrating a modified example (Modified Example #1: Control of Element Block Size) of the second embodiment.

FIG. 16 is a flowchart illustrating a modified example (Modified Example #1: Control of Element Block Size) of the second embodiment. FIG. 17 is a table illustrating a modified example (Modified Example #1: Control of Spreading Factor) of the second embodiment.

As has been described above, as the element block size increases, the beam width reduces and, as the element block size reduces, the beam width increases. The wider the beam width is, the easier tracking of the wireless terminal 201 that moves at high speed by a beam becomes. Therefore, the switching control unit 105 of the base station 100 controls the element block size in accordance with the moving state of the wireless terminal 201. That is, the switching control unit 105 appropriately selects a division pattern in accordance with the moving state of the wireless terminal 201.

When a spread code is used for orthogonalization of beams control of a spreading factor is performed in accordance with control of a division pattern. The spreading factor is expressed by a ratio of spread code speed (a chip rate) to transmission data speed (a bit rate). Note that, in the second embodiment, the spread code is used for orthogonalizing beams that are formed by the element blocks g#1, . . . , and g#N, and therefore, the spreading factor is controlled to be the same as the number of element blocks or larger than the number of element blocks.

A method for incorporating the above-described control in the processing flow (see FIG. 14) of the base station 100 will be described below. As illustrated in FIG. 16, in the modified example #1, processing of S103 is modified to be processing (Control of Element Block Size) of S201 and processing (Setting of Spreading Factor) of S202 is added thereto.

(S201) The switching control unit 105 detects the moving speed V of the wireless terminal 201. For example, the switching control unit 105 estimates the moving speed V of the wireless terminal 201 from a change with time of a beam direction, based on information of a preferable beam direction, which is fed back from the wireless terminal 201. Note that the moving speed V that is estimated from a change of beam direction is expressed by an angle speed.

The switching control unit 105 selects a division pattern of the element block size in accordance with the estimated moving speed V. For example, a relationship between the moving speed V, a beam width suitable for the moving speed V, an example of a division pattern that realizes the beam width, a block number (the number of element blocks) of the division pattern, and a spreading factor that corresponds to the block number is as illustrated in FIG. 17.

In the example of FIG. 17, as the division pattern, (NO DIVISION) and division patterns (8, 8), (4, 4, 4, 4), (4, 4, 2, 2, 2, 2), and (2, 2, 2, 2, 2, 2, 2, 2) are indicated. (NO DIVISION) corresponds to an NB control mode in which BF is performed in all of antenna elements that are included in the antenna array 100a. In (NO DIVISION), a largest number of antenna elements are used for BF, and therefore, it is possible to form a beam having a narrowest beam width.

The division pattern (8, 8) is a division pattern in which the antenna array 100a is divided into two element blocks each of the element block sizes of which is eight. When the division pattern (8, 8) in which the number of elements of each element block is eight is used, the beam width is wider than that in (NO DIVISION) in which sixteen antenna elements form a beam. In the division pattern (8, 8), the block number that corresponds to the number of beams that are orthogonalized is two, and therefore, the spreading factor is set to be two or more. However, the spreading factor may be set to be three or more in order to increase resistance.

The division pattern (4, 4, 4, 4) is a division pattern in which the antenna array 100a is divided into four element blocks each of the element block sizes of which is four. When the division pattern (4, 4, 4, 4) in which the number of elements of each element block is four is used, the beam width is wider than that in the division pattern (8, 8) in which eight antenna elements form a beam. In the division pattern (4, 4, 4, 4), the block number that corresponds to the number of beams that are orthogonalized is four, and therefore, the spreading factor is set to be four or more. However, the spreading factor may be set to be five or more in order to increase resistance.

The division pattern (4, 4, 2, 2, 2, 2) is a division pattern in which the antenna array 100a is divided into two element blocks each of the element block sizes of which is four and four element blocks each of the element block sizes of which is two. When the division pattern (4, 4, 2, 2, 2, 2) which includes element blocks each of the element block sizes of which is two is used, the beam width is wider than that in the division pattern (4, 4, 4, 4) in which only four antenna elements form a beam.

Note that a division pattern in which element blocks element block sizes of which are different from one another are mixed is sometimes called "irregular number" division pattern. Although, in the division pattern (4, 4, 2, 2, 2, 2), the block number that corresponds to the number of beams that are orthogonalized is six, the division pattern (4, 4, 2, 2, 2, 2) is an irregular division pattern, and therefore, the spreading factor is set to be eight or more. However, the spreading factor may be set to be nine or more in order to increase resistance.

The division pattern (2, 2, 2, 2, 2, 2, 2, 2) is a division pattern in which the antenna array 100a is divided into eight element blocks each of the element block sizes of which is two. When the division pattern (2, 2, 2, 2, 2, 2, 2, 2) in which the number of elements of each element block is two is used, the beam width is wider than that in the division pattern (4, 4, 2, 2, 2, 2) which includes element blocks each of the element block sizes of which is four. In the division pattern (2, 2, 2, 2, 2, 2, 2, 2), the block number that corresponds to the number of beams that are orthogonalized is eight, and therefore, the spreading factor is set to be eight or more. However, the spreading factor may be set to be nine or more in order to increase resistance.

As described above, a beam width is determined in accordance with a division pattern. Also, the wider a beam width is, the easier tracking of the wireless terminal 201 that moves at higher speed becomes. Therefore, the switching control unit 105 determines to which of "LOW SPEED", "MEDIUM-LOW SPEED", "MEDIUM SPEED", "MEDIUM-HIGH SPEED", and "HIGH SPEED" the moving peed V of the wireless terminal 201 corresponds and a division pattern is selected in accordance with a result of the determination.

For example, a speed range of "LOW SPEED", a speed range of "MEDIUM-LOW SPEED", a speed range of "MEDIUM SPEED", a speed range of "MEDIUM-HIGH SPEED", and a speed range of "HIGH SPEED" are set and stored in the switching control unit 105 in advance and the switching control unit 105 specifies a speed range including the detected moving speed V. Then, the switching control unit 105 selects a division pattern that corresponds to the specified speed range.

Note that it is possible to experimentally determine the above-described speed range using a method in which beam tracking is performed using each division pattern to detect a throughput in the wireless terminal 201 and thus an upper limit of moving speed with which a detection result falls in an acceptable range is determined, or the like. As a matter of course, the above-described speed range may be determined using another method.

(S202) The switching control unit 105 sets the spreading factor (for example, a spreading factor that is equal to the block number or a spreading factor that is larger than the block number) which corresponds to the block number of the division pattern that has been selected in S201. When processing of S202 is completed, the process proceeds to processing of S104 described above.

The modified example #1 has been described above. As described above, it is possible to increase, by switching a division pattern in accordance with the moving speed V, trackability of a beam. Also, it is possible to narrow down a beam width in a range in which trackability of a beam is maintained and therefore, the modified example #1 contributes to increase in gain.

Modified Example #2: Control of Reception Beam

Next, as a modified example #2, with reference to FIG. 18, a method in which a reception beam is controlled in accordance with a moving state of the wireless terminal 201 will be described.

Note that, in the modified example #2, it is premised that the wireless terminal 201 includes a plurality of antennas and it is possible to perform reception BF using the plurality of antennas. Reception BF is a technology of adjusting a phase of a signal that is input from each antenna and steering a direction (a reception beam direction) in which a reception sensitivity increases towards a transmission side. FIG. 18 is a flowchart illustrating a modified example (Modified Example #2: Control of Reception Beam) of the second embodiment.

Figure 18:
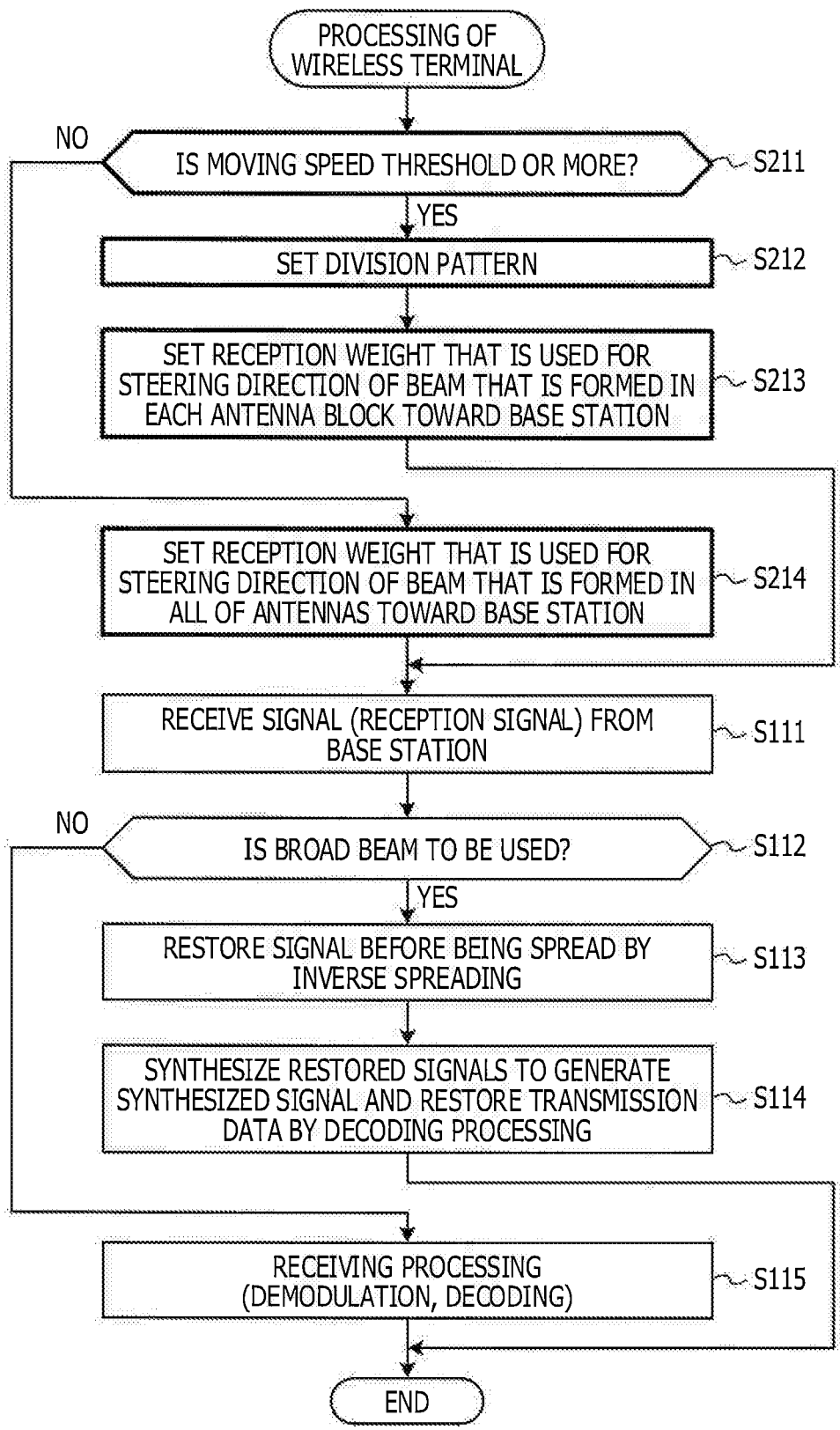
FIG. 18 is a flowchart illustrating a modified example (Modified Example #2: Control of Reception Beam) of the second embodiment.

In the Modified Example #2, processing of S211 to S214 illustrated in FIG. 18 is added to the processing flow illustrated in FIG. 15. The processing of S211 to S214 will be described below.

(S211) The switching control unit 215 determines whether or not the moving speed V of the wireless terminal 201 is a threshold ThM or more. The moving speed V is detected, for example, using GPS, an accelerator sensor, or the like. The threshold ThM is set to be, for example, the upper limit of a moving speed with which, if all of the plurality of antennas is used, a throughput falls in an acceptable range. If the moving speed V is the threshold ThM or more, the process proceeds to S212. On the other hand, if the moving speed V is not the threshold ThM or more, the process proceeds to S214.

(S212) The switching control unit 215 sets a division pattern. The division pattern is a pattern in which the plurality of antennas of the wireless terminal 201 is divided into two or more antenna blocks. Each antenna block includes two or more antennas. The division pattern may be set in a similar manner to that for the above-described element blocks (see FIG. 11, FIG. 12, and FIG. 17).

(S213) The switching control unit 215 sets a reception weight that is used for steering a direction of a beam that is formed by each antenna block toward the base station 100. For example, the switching control unit 215 sets the reception weight for a phase shifter of the RF circuit 201b and controls the direction of the beam that is formed by each antenna block in a direction toward the base station 100. When processing of S213 is completed, the process proceeds to S111 described above.

(S214) The switching control unit 215 sets reception weights that are used for steering directions of beams that are formed by all of the antennas of the wireless terminal 201 toward the base station 100. When processing of S214 is completed, the process proceeds to S111 described above.

The modified example #2 has been described above. As described above, it is possible to increase, when the wireless terminal 201 includes a plurality of antennas, a beam width by dividing the plurality of antennas into antenna block groups and thus forming a beam by each antenna block. Also at a reception side, trackability of a beam may be increased by controlling the beam width in accordance with the moving speed V.

Modified Example #3: Orthogonalization by Band Division

Next, as a modified example #3, with reference to FIG. 19 and FIG. 20, a method in which the above-described orthogonalization is realized by dividing a usable frequency band into a plurality of different frequency bands (band division) and transmitting signals that are transmitted by respective element blocks in different frequency bands will be described.

Note that, in the modified example #3, signals that are transmitted from respective element blocks are orthogonalized by band division, and therefore, spreading of a signal using a spread code may be omitted. FIG. 19 is a first flowchart illustrating a modified example (Modified Example #3: Orthogonalization by Band Division) of the second embodiment. FIG. 20 is a second flowchart illustrating the modified example (Modified Example #3: Orthogonalization by Band Division) of the second embodiment.

Figure 19:
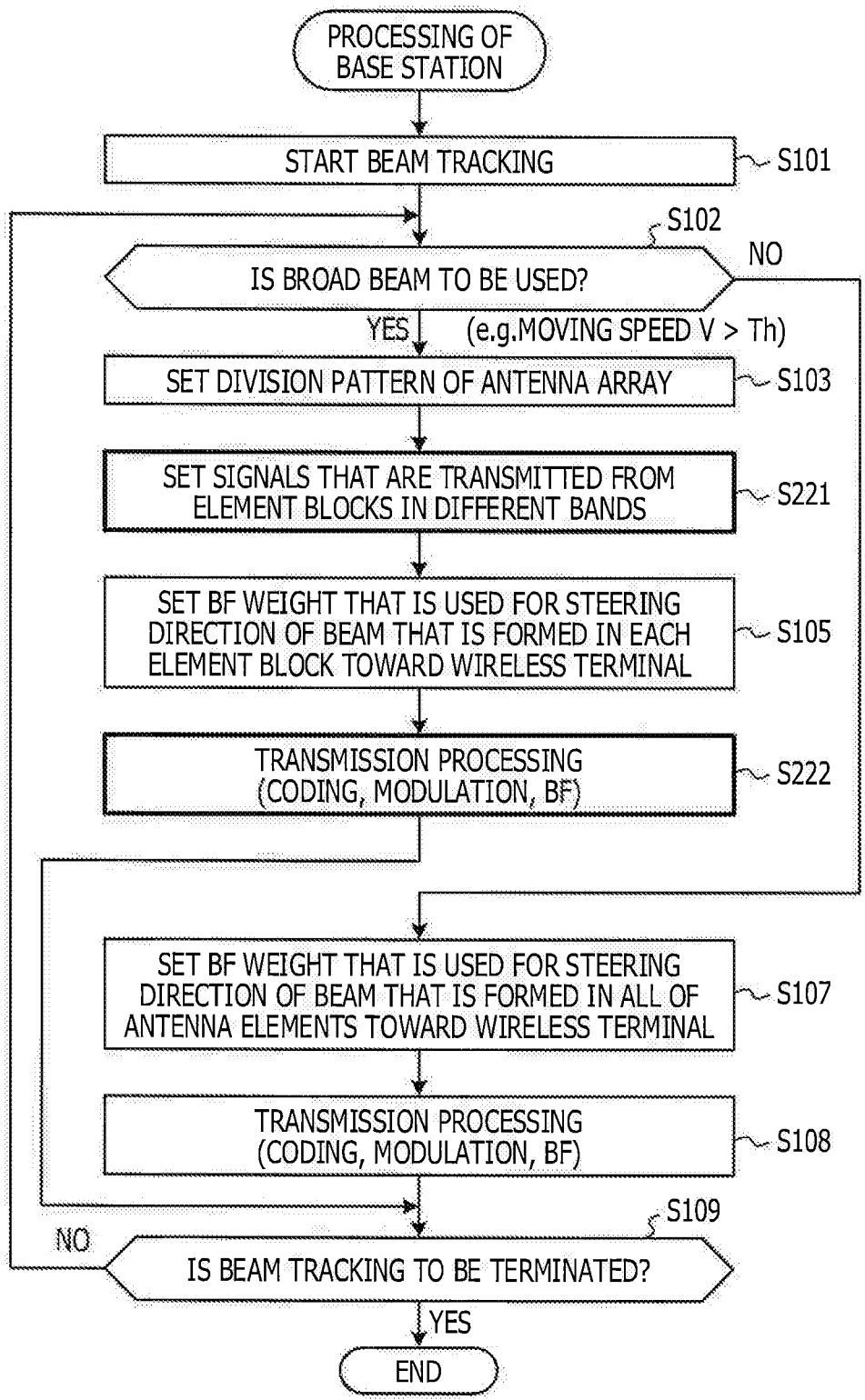
FIG. 19 is a first flowchart illustrating a modified example (Modified Example #3: Orthogonalization by Band Division) of the second embodiment.

In the modified example #3, with respect to the processing flow illustrated in FIG. 14, processing of S104 is modified to be processing of S221 illustrated in FIG. 19 and processing of S106 is modified to be processing S222 illustrated in FIG. 19. Also, in the modified example #3, with respect to the processing flow illustrated in FIG. 15, processing of S113 and S114 is modified to be processing of S231 illustrated in FIG. 20.

First, processing of the base station 100 will be described.

(S221) The switching control unit 105 sets signals that are transmitted from respective element blocks in different bands (frequency bands). For example, the switching control unit 105 controls setting of the orthogonal conversion unit 104 such that signals that are transmitted from element blocks g#1, ..., and #N are transmitted in different bands F#1, ..., and #N. When processing of S221 is completed, the process proceeds to S105 described above. Then, when processing of S105 is completed, the process proceeds to S222.

(S222) The coding unit 101 codes data using an error correction code, such as a Turbo code or the like. The data after being coded is output to the modulation unit 102. The modulation unit 102 modulates the data after being coded by a predetermined modulation method (BPSK, QPSK, 16QAM, 64QAM, or the like) and generates a transmission signal. The transmission signal is output to the transmission BF unit 103.

The transmission BF unit 103 causes the phase shifter units #1, ..., and #N to multiply transmission signals by the transmission BF weight groups and shift phases of the transmission signals. For example, the phase shifter #k (k=1, ..., and N) multiplies a transmission signal that is output from a qth (q=1, ..., and n) antenna element included in the element block g#k by a transmission BF weight wq and shifts a phase of the transmission signal. The transmission signal after being phase-shifted is output to the orthogonal conversion unit 104. The orthogonal conversion unit 104 transmits n transmission signals from the element block g#k (k=1, ..., and N) in a band F#k.

Each of beams that are formed by the element blocks g#1, ..., and g#N is controlled and steered in a direction toward the wireless terminal 201 by the transmission BF weight groups. The beams that are formed by the element blocks g#1, ..., and g#N are orthogonalized with one another by using the bands F#1, ..., and F#N. The element block size is smaller than the total number of antenna elements that are included in the antenna array 100a, and therefore, a board beam is formed. A high gain is achieved by synthesizing signals that are received using the bands F#1, ..., and F#N at a side of the wireless terminal 201.

When processing of S222 is completed, the process proceeds to S109 described above.

Next, processing of the wireless terminal 201 will be described.

(S231) In the modified example #3, a signal (a reception signal) is received by the orthogonal inverse conversion unit 211 in each of a plurality of bands (bands F#1, . . . , and F#N). A plurality of reception signals that correspond to the bands F#1, . . . , and #N is output to the demodulation unit 212.

The demodulation unit 212 performs demodulation processing on each reception signal by a predetermined modulation method (BPSK, QPSK, 16QAM, 64QAM, or the like) to generate reception data. The reception data is output to the synthesis unit 213. The synthesis unit 213 synthesizes n pieces of reception data that correspond to the bands F#1, . . . , and F#N to generate synthesized data. The synthesized data is output to the decoding unit 214. The decoding unit 214 restores transmission data from the synthesized data by decoding processing.

Figure 20:
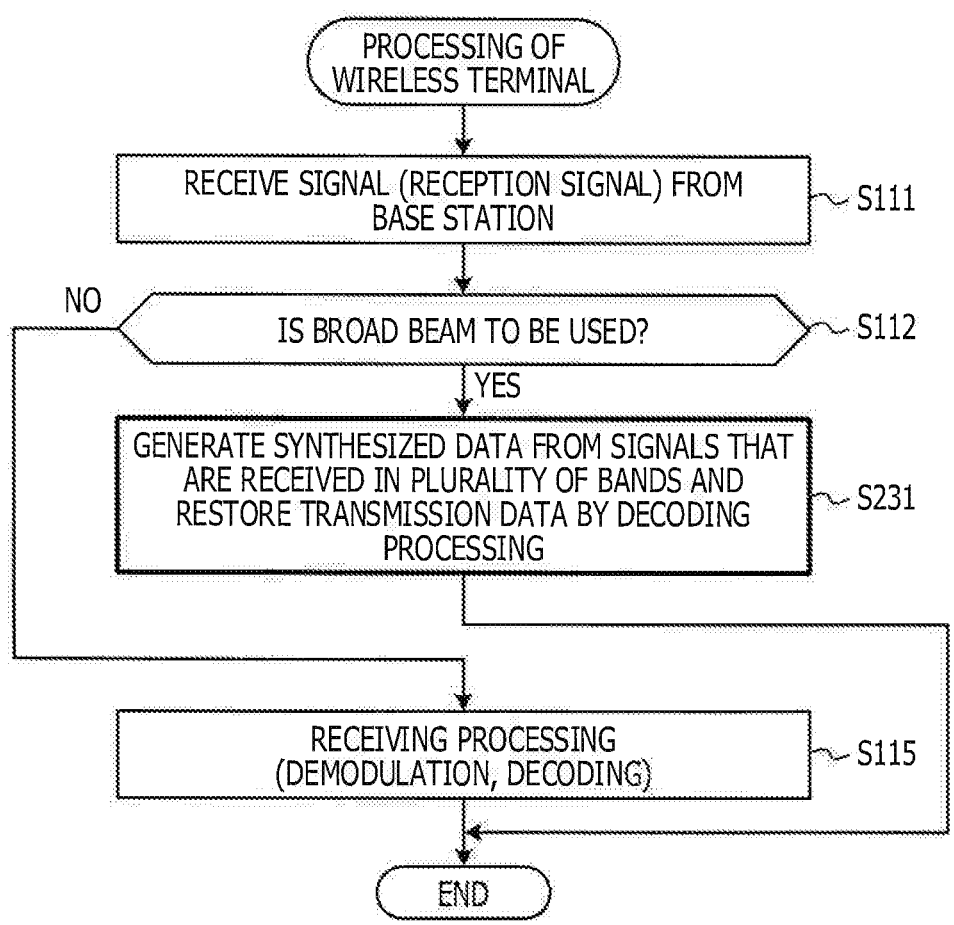
FIG. 20 is a second flowchart illustrating the modified example (Modified Example #3: Orthogonalization by Band Division) of the second embodiment.

When processing of S231 is completed, a series of processes illustrated in FIG. 20 ends.

As described above, in the modified example #3, a spread code is not used for orthogonalization of beams that are formed by the element blocks g#1, . . . , and g#N. Therefore, signals are transmitted using a plurality of different frequency bands, instead of spreading the signals, and the signals are received using the plurality of frequency bands in the wireless terminal 201. As described above, beams may be orthogonalized by some other method than spreading.

As described above, the technology according to the second embodiment may be modified. Also, as a matter of course, the above-described modified examples also fall in a technical scope of the second embodiment.

The second embodiment has been described above.

As described above, by dividing the antenna array 100a into a plurality of element blocks, forming a broad beam in each element block, and orthogonalizing signals that are transmitted by the element blocks, a high gain is efficiently achieved when a broad beam is used. As a result, it is enabled to achieve a desired gain without increasing a power amount that is supplied to each antenna element and to thus reduce a load that is applied to each antenna element.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
an antenna array including a plurality of antenna elements; and
a control circuit coupled to the antenna array and configured to
execute a first process that includes dividing the plurality of antenna elements into a plurality of element blocks, each of the plurality of element blocks including two or more antenna elements,
execute a second process that includes forming a broad beam by steering beams that are formed by first and second element blocks of the plurality of element blocks in a way that a direction of a first beam from the first element block is in a same direction as a direction of a second beam from the second element block, the first beam formed by the first element block being orthogonalized with the second beam formed by the second element block, and
execute a third process that includes orthogonalizing a first signal to be transmitted by the first element block and a second signal to be transmitted by the second element block on a same transmission time interval with a same throughput, both the first signal and the second signal being generated from same data as each other on the same transmission time interval.

2. The base station according to claim 1, wherein
the third process is configured to orthogonalize the first signal and the second signal in accordance with a spread code.

3. The base station according to claim 2, wherein
the control circuit is configured to
execute a fourth process that includes controlling the number of antenna elements that are included in the first and second element blocks in accordance with a moving state of a wireless terminal that receives the signal.

4. The base station according to claim 1, wherein
the control circuit is configured to
execute a fourth process that includes transmitting the first signal in a first frequency, and transmitting the second signal in a second frequency that is different from the first frequency.

5. The base station according to claim 1, wherein
the control circuit is configured to
execute a fourth process that includes switching between a first control mode in which a beam is formed by each of the plurality of element blocks and a second control mode in which a single beam is formed by the plurality of antenna elements.

6. The base station according to claim 1, wherein
the second process is further configured to steer a beam that is formed by some other element block of the plurality of element blocks than the first and second element blocks in the same direction as a direction of beams that are formed by the first and second element blocks, and
the third process is further configured to orthogonalize the first and second signals and a third signal to be transmitted by the some other element block.

7. A wireless terminal comprising:
a receiving circuit configured to receive a first signal and a second signal from a base station, both the first signal and the second signal being generated by the base station from same data as each other on a same transmission time interval, the first signal being orthogonalized with the second signal by first and second element blocks of the base station and being received with a same throughput as the second signal, each of the first and second element blocks including two or more antenna elements;
a control circuit configured to:
synthesize the first and second signals into a single data sequence by performing an orthogonal inverse conversion on the first and second signals, the orthogonal inverse conversion including a first inverse spreading processing and a second inverse spreading processing, the first inverse spreading processing being processing corresponding to the first signal, the second inverse spreading processing being processing corresponding to the second signal, and
perform a decoding processing on the single data sequence.

8. A wireless system comprising:
a base station including
an antenna array including a plurality of antenna elements, and
a control circuit coupled to the antenna array and configured to
execute a first process that includes dividing the plurality of antenna elements into a plurality of element blocks, each of the plurality of element blocks including two or more antenna elements,
execute a second process that includes forming a broad beam by steering beams that are formed by first and second element blocks of the plurality of element blocks in a way that a direction of a first beam from the first element block is in a same direction as a direction of a second beam from the second element block, the first beam formed by the first element block being orthogonalized with the second beam formed by the second element block, and
execute a third process that includes orthogonalizing a first signal to be transmitted by the first element block and a second signal to be transmitted by the second element block on a same transmission time interval with a same throughput, both the first signal and the second signal being generated from same data as each other on the same transmission time interval; and
a wireless terminal including
a receiving circuit configured to receive the first signal that is transmitted by the first element block and the second signal that is transmitted by the second element block from the base station, and
a second control circuit configured to synthesize the first and second signals into a single data sequence, and perform a decoding processing on the single data sequence.

9. A communication control method for causing a wireless communication device including an antenna array including a plurality of antenna elements to execute a process, the process comprising:
executing a first process that includes dividing the plurality of antenna elements into a plurality of element blocks, each of the plurality of element blocks including two or more antenna elements;
executing a second process that includes forming a broad beam by steering beams that are formed by first and second element blocks of the plurality of element blocks in a way that a direction of a first beam from the first element block is in a same direction as a direction of a second beam from the second element block, the first beam formed by the first element block being orthogonalized with the second beam formed by the second element block; and
executing a third process that includes orthogonalizing a first signal to be transmitted by the first element block and a second signal to be transmitted by the second element block on a same transmission time interval with a same throughput, both the first signal and the second signal being generated from same data as each other on the same transmission time interval.

* * * * *